(12) United States Patent
Yasuoka

(10) Patent No.: US 10,469,796 B2
(45) Date of Patent: Nov. 5, 2019

(54) INFORMATION PROCESSING APPARATUS, INFORMATION PROCESSING METHOD, AND NON-TRANSITORY COMPUTER READABLE STORAGE MEDIUM

(71) Applicant: FUJI XEROX CO., LTD., Tokyo (JP)

(72) Inventor: Daisuke Yasuoka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 73 days.

(21) Appl. No.: 15/793,605

(22) Filed: Oct. 25, 2017

(65) Prior Publication Data
US 2018/0309953 A1 Oct. 25, 2018

(30) Foreign Application Priority Data
Apr. 21, 2017 (JP) ................. 2017-084273

(51) Int. Cl.
| | | |
|---|---|---|
| G09G 5/00 | (2006.01) | |
| H04N 7/00 | (2011.01) | |
| H04N 1/00 | (2006.01) | |
| G06T 11/20 | (2006.01) | |
| G06T 7/00 | (2017.01) | |
| G06T 19/00 | (2011.01) | |

(52) U.S. Cl.
CPC ........... H04N 7/007 (2013.01); G06T 7/0002 (2013.01); G06T 11/20 (2013.01); G06T 19/006 (2013.01); H04N 1/00098 (2013.01); H04N 1/00962 (2013.01)

(58) Field of Classification Search
CPC .............................. G06T 19/006; G06T 11/20
See application file for complete search history.

(56) References Cited

U.S. PATENT DOCUMENTS

| | | | | |
|---|---|---|---|---|
| 9,846,996 B1* | 12/2017 | Moore | ................. | G07F 19/209 |
| 2011/0281644 A1* | 11/2011 | Kawamoto | ........... | G06T 19/006 |
| | | | | 463/30 |
| 2012/0075343 A1* | 3/2012 | Chen | ..................... | G09G 5/397 |
| | | | | 345/633 |

(Continued)

FOREIGN PATENT DOCUMENTS

| | | |
|---|---|---|
| JP | 2012-059292 A | 3/2012 |
| JP | 2015-099448 A | 5/2015 |
| JP | 2015-102909 A | 6/2015 |

*Primary Examiner* — Charles Tseng
(74) *Attorney, Agent, or Firm* — Oliff PLC

(57) ABSTRACT

An information processing apparatus includes an image capturing unit, a display, and a controller. The image capturing unit is configured to capture images of a real space. The display is configured to display the images. If an image of a specific portion of a target an operation of which is to be described is included in the images captured by the image capturing unit, the controller generate operation description images by adding an image for instructing the operation to the captured images and controls the display to sequentially display the generated operation description images. When generating the operation description images, the controller stores a part of the generated operation description images. If the specific portion cannot be detected from the images captured by the image capturing unit before description on the operation of the specific portion is completed, the controller displays the stored operation description images on the display.

14 Claims, 22 Drawing Sheets

(56) References Cited

U.S. PATENT DOCUMENTS

| | | | |
|---|---|---|---|
| 2013/0281206 A1* | 10/2013 | Lyons | G07F 17/3211 463/33 |
| 2015/0091780 A1* | 4/2015 | Lyren | G02B 27/017 345/8 |
| 2015/0138232 A1 | 5/2015 | Sugimoto | |
| 2015/0138595 A1 | 5/2015 | Sugimoto | |

* cited by examiner

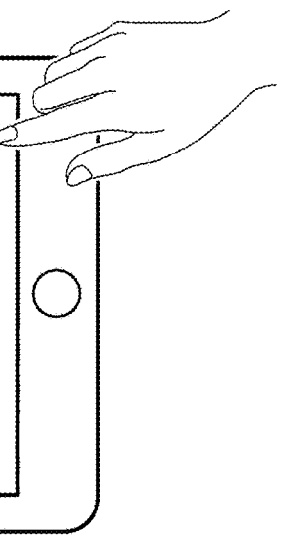
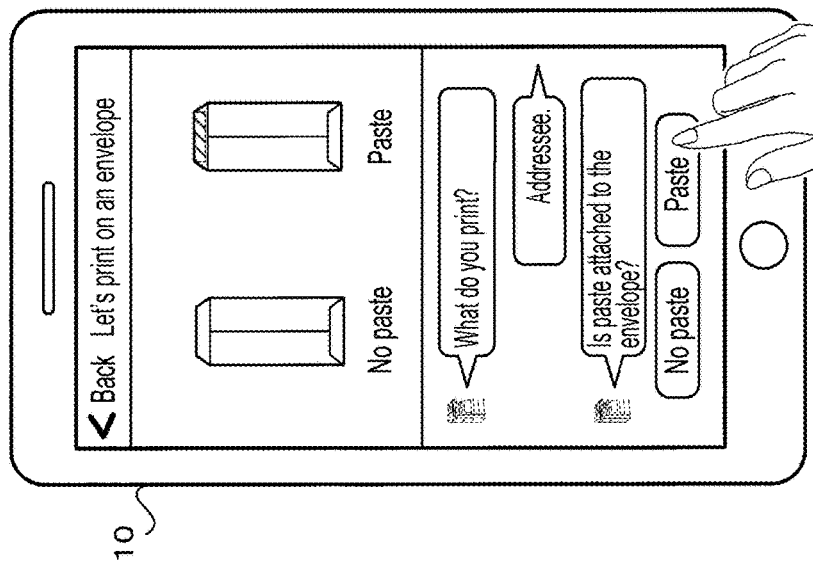

INFORMATION PROCESSING APPARATUS, INFORMATION PROCESSING METHOD, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2017-084273 filed Apr. 21, 2017.

BACKGROUND

Technical Field

The present invention relates to an information processing apparatus, an information processing method, and a non-transitory computer readable storage medium.

SUMMARY

According to an aspect of the invention, an information processing apparatus includes an image capturing unit, a display, and a controller. The image capturing unit is configured to capture images of a real space. The display is configured to display the images. If an image of a specific portion of a target an operation of which is to be described is included in the images captured by the image capturing unit, the controller generate operation description images by adding an image for instructing the operation to the captured images and controls the display to sequentially display the generated operation description images. When generating the operation description images, the controller stores a part of the generated operation description images. If the specific portion cannot be detected from the images captured by the image capturing unit before description on the operation of the specific portion is completed, the controller displays the stored operation description images on the display.

BRIEF DESCRIPTION OF THE DRAWINGS

Exemplary embodiments of the present invention will be described in detail based on the following figures, wherein:

FIGS. 8A and 8B illustrate an example of a display screen illustrating one example of a specific operation description performed by the terminal device according to the exemplary embodiment of the present invention;

DETAILED DESCRIPTION

Next, exemplary embodiments of the present invention will be described in detail with reference to the accompanying drawings.

Figure 1:
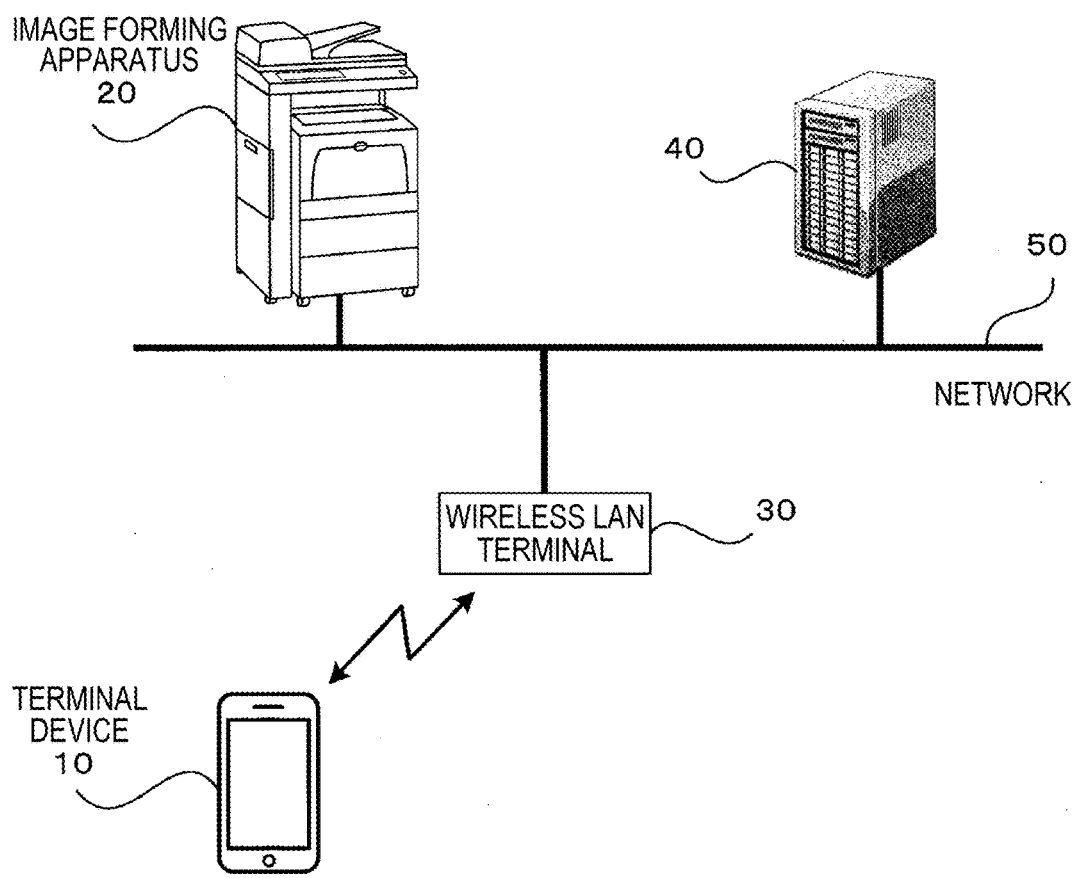
FIG. 1 is a diagram illustrating a system configuration of an operation description display system according to an exemplary embodiment of the present invention.

FIG. 1 is a diagram illustrating a system configuration of an operation description display system according to an exemplary embodiment of the present invention;

The operation description display system of the exemplary embodiment describes an operation of an image forming apparatus 20 which is a target the operation of which is to be described, by using a terminal device 10 such as a smartphone or a tablet terminal. Further, the image forming apparatus 20 is an apparatus called a multifunction device having plural functions including a print function, a scan function, a copy function, a facsimile function, and the like.

In the following description, description will be given on a case where the terminal device 10 is a smartphone. In addition, application software (hereinafter, referred to as app) for describing the operation is downloaded to the terminal device 10, and as a result, a function to describe the operation of the image forming apparatus 20 is achieved.

In the operation description display system of the exemplary embodiment of the present invention, as illustrated in FIG. 1, the image forming apparatus 20 which is the target the operation of which is to be described, a wireless LAN terminal 30, and a distribution server 40 are connected by a network 50. The distribution server 40 distributes contents for describing the operation of the image forming apparatus 20 to the terminal device 10.

The terminal device 10 is connected to the wireless LAN terminal 30 by a wireless line to be connected to the distribution server 40. In addition, the distribution server 40 is configured such that when a new operation description of the image forming apparatus 20 and the like are added, the distribution server 40 is capable of distributing the additional operation description to the terminal device 10.

In the operation description display system of the exemplary embodiment, a specific portion to be described in the image forming apparatus 20 is captured by a camera of the terminal device 10, and a process of adding various images for instructing an operation to images including the specific portion by an augmented reality (AR) technique and displaying the resultant images as an operation description image is performed. Further, specific contents of the operation description images will be described later.

Figure 2:
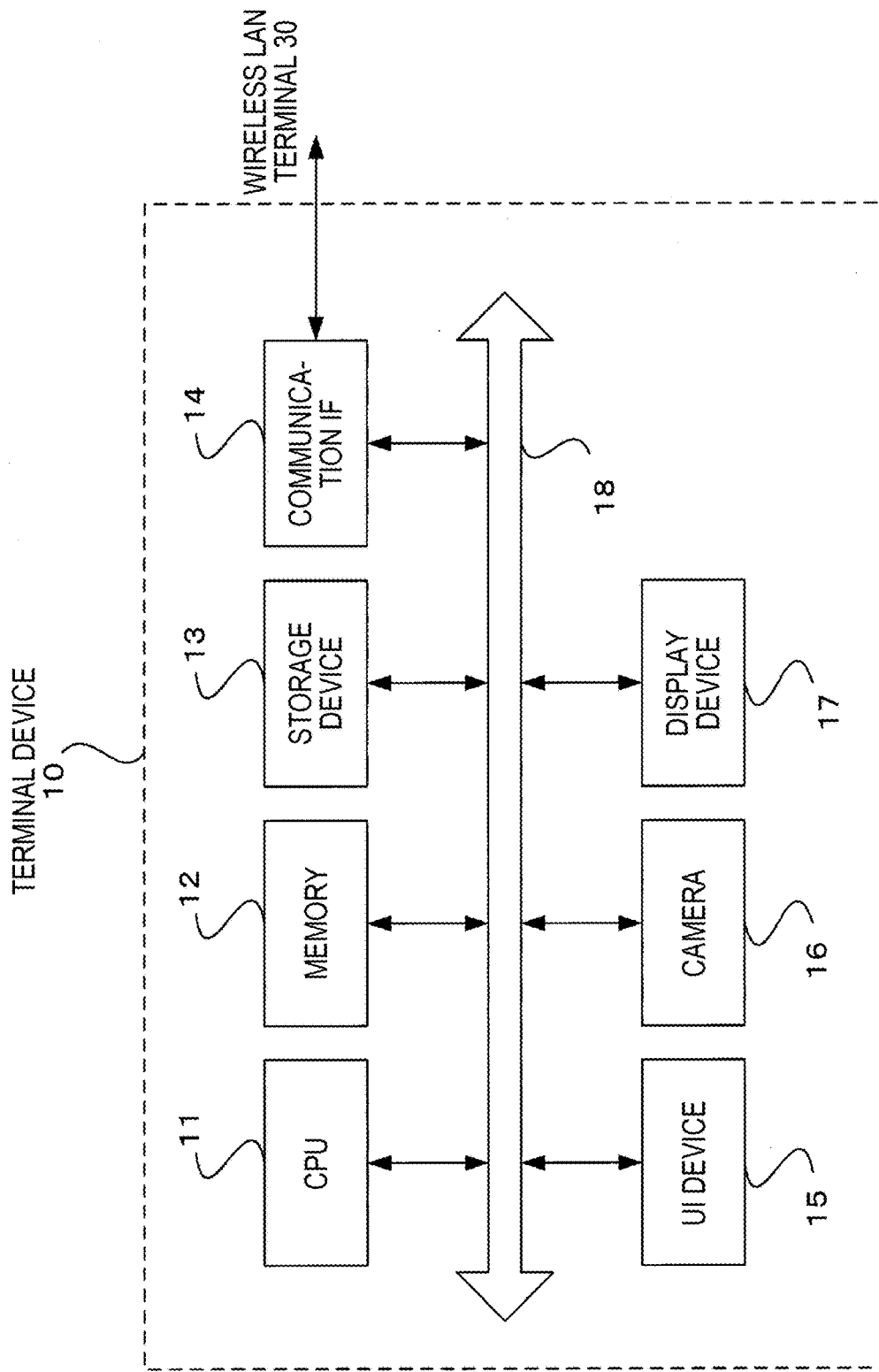
FIG. 2 is a block diagram illustrating a hardware configuration of a terminal device according to the exemplary embodiment of the present invention.

Next, a hardware configuration of the terminal device 10 in the operation description display system of the exemplary embodiment is illustrated in FIG. 2.

The terminal device 10 includes a CPU 11, a memory 12, a storage device 13 such as a flash memory, a communication interface (IF) 14 that transmits and receives data to and from the wireless LAN terminal 30 via the wireless line, a user interface (UI) device 15 such as a touch panel, a camera 16, and a display device 17 such as a liquid crystal display as illustrated in FIG. 2. The components are connected to each other via a control bus 18.

The CPU 11 executes a predetermined process based on a control program stored in the memory 12 or the storage device 13 to control the operation of the terminal device 10. Further, in the exemplary embodiment, it has been described that the CPU 11 reads and executes the control program stored in the memory 12 or the storage device 13. Alternatively, the control program may be stored in a storage medium such as an SD card and provided to the CPU 11.

Figure 3:
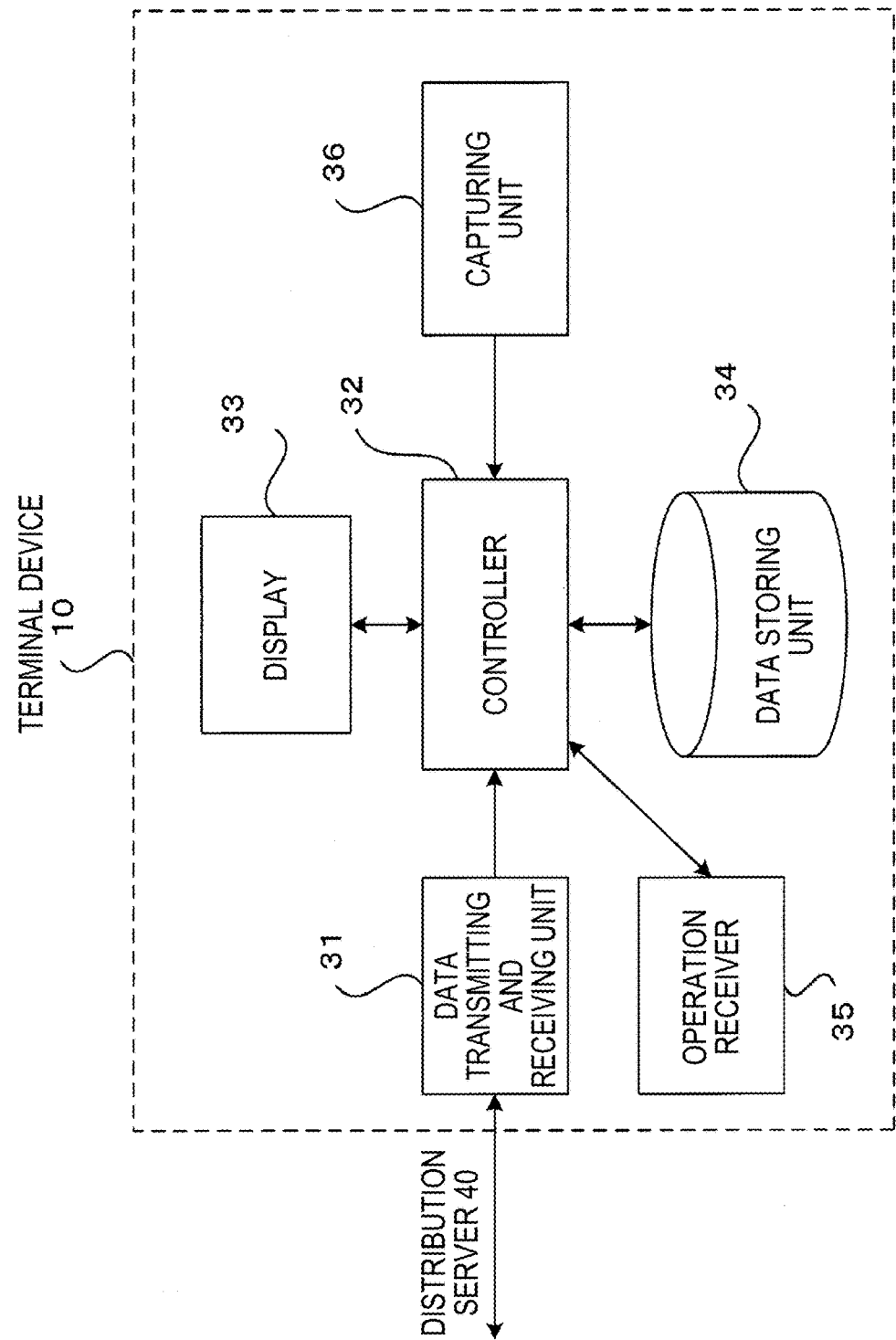
FIG. 3 is a block diagram illustrating a functional configuration of the terminal device according to the exemplary embodiment of the present invention.

FIG. 3 is a block diagram illustrating a functional configuration of the terminal device 10 which is implemented by executing the control program.

The terminal device 10 of the exemplary embodiment includes a data transmitting and receiving unit 31, a controller 32, a display 33, a data storing unit 34, an operation receiver 35, and an image capturing unit 36 as illustrated in FIG. 3.

The data transmitting and receiving unit 31 transmits and receives data to and from the distribution server 40 under the control of the controller 32.

The display 33 is configured to display various images under the control of the controller 32.

The data storing unit 34 stores various data including (i) feature information of images of various specific portions operations required to describe operations of, for example, a manual feed tray, an operation panel, an automatic document feeder, and a paper tray in the image forming apparatus 20 the operation of which is to be described, (ii) operation description images generated by the controller 32, and the like.

The operation receiver 35 receives instructions or various input operations by a user.

The image capturing unit 36 serves as an image capturing unit that captures images of a real space.

If an image of the specific portion of the image forming apparatus 20 the operation of which is to be described is included in the images captured by the image capturing unit 36, the controller unit 32 generate operation description images by adding an image for instructing the operation to the captured images, and controls the display 33 to sequentially display the generated operation description images.

Herein, examples of the image for instructing the operation added to the captured images include various images such as an arrow image showing an operation location or an operation direction, a text image for describing an operation content, a paper image for describing a setting location, and an envelope image.

When the operation description images are generated, the controller 32 stores a part of the generated operation description images in the data storing unit 34. If the specific portion cannot be detected from the images captured by the image capturing unit 36 before the description on the operation of the specific portion is completed, the controller 32 displays the stored operation description image on the display 33 as a still image.

At that time, the controller 32 stores the latest operation description image in the data storing unit 34 by updating an operation description image which is already stored in the data storing unit 34, using the generated operation description images.

For example, when sequentially generating the operation description images for a certain specific portion and displaying the generated operation description images on the display 33, the controller 32 stores the image of the last generated frame as a still image. Then, if the specific portion cannot be detected in the captured images, the controller 32 displays the stored still image on the display 33.

The controller 32 may store the generated plural operation description images. Then, when it is instructed to display the operation description image which was displayed in the past, the controller 32 may display the operation description image instructed to be displayed, among the stored plural operation description images, on the display 33.

Further, the controller 32 may not store the generated operation description images in the data storing unit 34, but store the images used in generating the operation description images. Then, if the specific portion cannot be detected in the captured images, the controller 32 may generate the operation description images by adding the image for describing the operation again onto the stored images, and display the thus-generated operation description images on the display 33.

Further, when it is determined whether the image of the specific portion is included in the images captured by the image capturing unit 36, if the feature information in the images captured by the image capturing unit 36 coincides with predetermined feature information stored in the data storing unit 34, the controller 32 determines that a specific portion to be described is included in the images.

If the description on the operation of the specific portion is continued and if the feature information used in first detecting the specific portion the operation of which is to be described and the feature information in the images captured by the image capturing unit 36 do not coincide with each other, the controller 32 determines that the specific portion cannot be detected from the images captured by the image capturing unit 36.

Figure 4B:
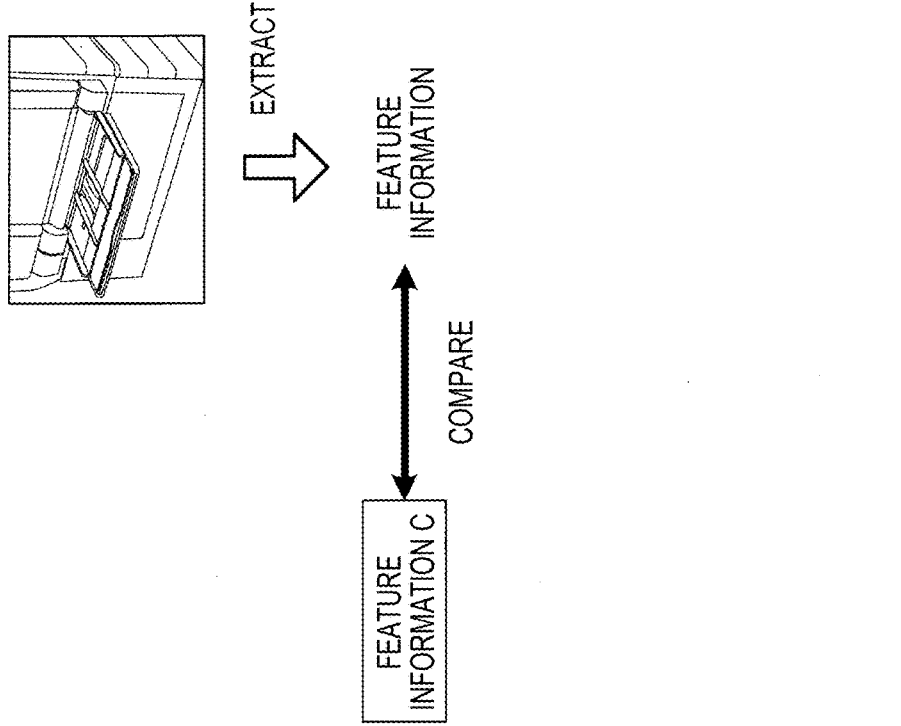
FIGS. 4A and 4B are diagrams for describing a specific example of extracting an image of a manual feed tray from a captured image when a specific portion an operation of which is to be described is the manual feed tray.

For example, description will be made on a specific example in which the specific portion the operation of which to be described is a manual feed tray and an image of a manual feed tray is extracted from the captured image, with reference to FIGS. 4A and 4B.

Figure 4A:
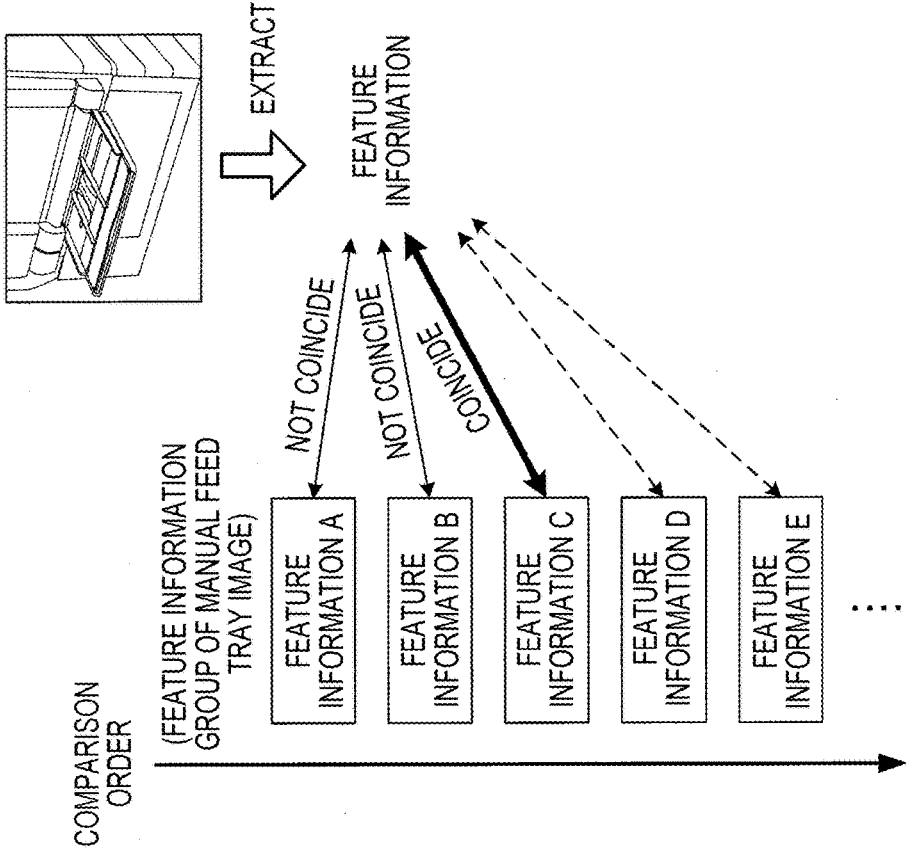

Herein, it is assumed that a feature information group including plural pieces of feature information of a manual feed tray image is stored in the data storing unit 34 as illustrated in FIG. 4A.

Specifically, image features are extracted from images of various manual feed trays under different conditions such as a photographing direction, brightness and a lighting color, to store plural pieces of generated feature information A, B, C, D, E, . . . in the data storing unit 34.

When the image of the manual feed tray is detected from the captured image at the beginning of the description on the operation, as illustrated in FIG. 4A, the controller 32 sequentially compares the feature information extracted from the image captured by the image capturing unit 36 with the feature information A, B, C, . . . in this order. Herein, for example, it is assumed that the feature information extracted from the image captured by the image capturing unit 36 coincides with the feature information C. In this case, while continuing the description of the manual feed tray, the controller 32 detects the manual feed tray from the images captured by the image capturing unit 36 and detects (i) whether there is an image of the manual feed tray and (ii) a direction and a position of the manual feed tray, using the feature information C.

Even when the stored operation description images are being displayed on the display 33, the controller 32 determines whether the image of the manual feed tray is included in the images captured by the image capturing unit 36. If the image of the manual feed tray is included in the captured images, the controller 32 switches the image displayed on the display 33 from the stored operation description images to the operation description images acquired by adding the image for instructing the operation to the images captured by the image capturing unit 36.

If it is determined that a required operation is performed on the specific portion, the controller 32 determines that it is completed to describe the operation of the specific portion. Specifically, when a user inputs completion of the operation, the controller 32 determines that the required operation is performed on the specific portion. In addition, the controller 32 may detect that the required operation is performed on the specific portion, from the image of the specific portion included in the images captured by the image capturing unit 36.

Furthermore, the operation description display system of the exemplary embodiment has a function of, when the operation is described, determining whether the user correctly operates as described in the description on the operation.

Specifically, the controller 32 determines whether a correct operation is performed on the specific portion, based on the image of the specific portion included in the images captured by the image capturing unit 36. Then, if it is determined that the correct operation is performed on the specific portion, the controller 32 displays information indicating that the correct operation is performed, on the display 33. Conversely, if it is determined that the correct operation is not performed on the specific portion, the controller 32 displays on the display 33 information indicating that an erroneous operation is performed, and adds and displays a correction instruction image for correcting the operation to the correct operation.

Next, the operation of the operation description display system of the exemplary embodiment will be described in detail with reference to the drawings.

Figure 5:
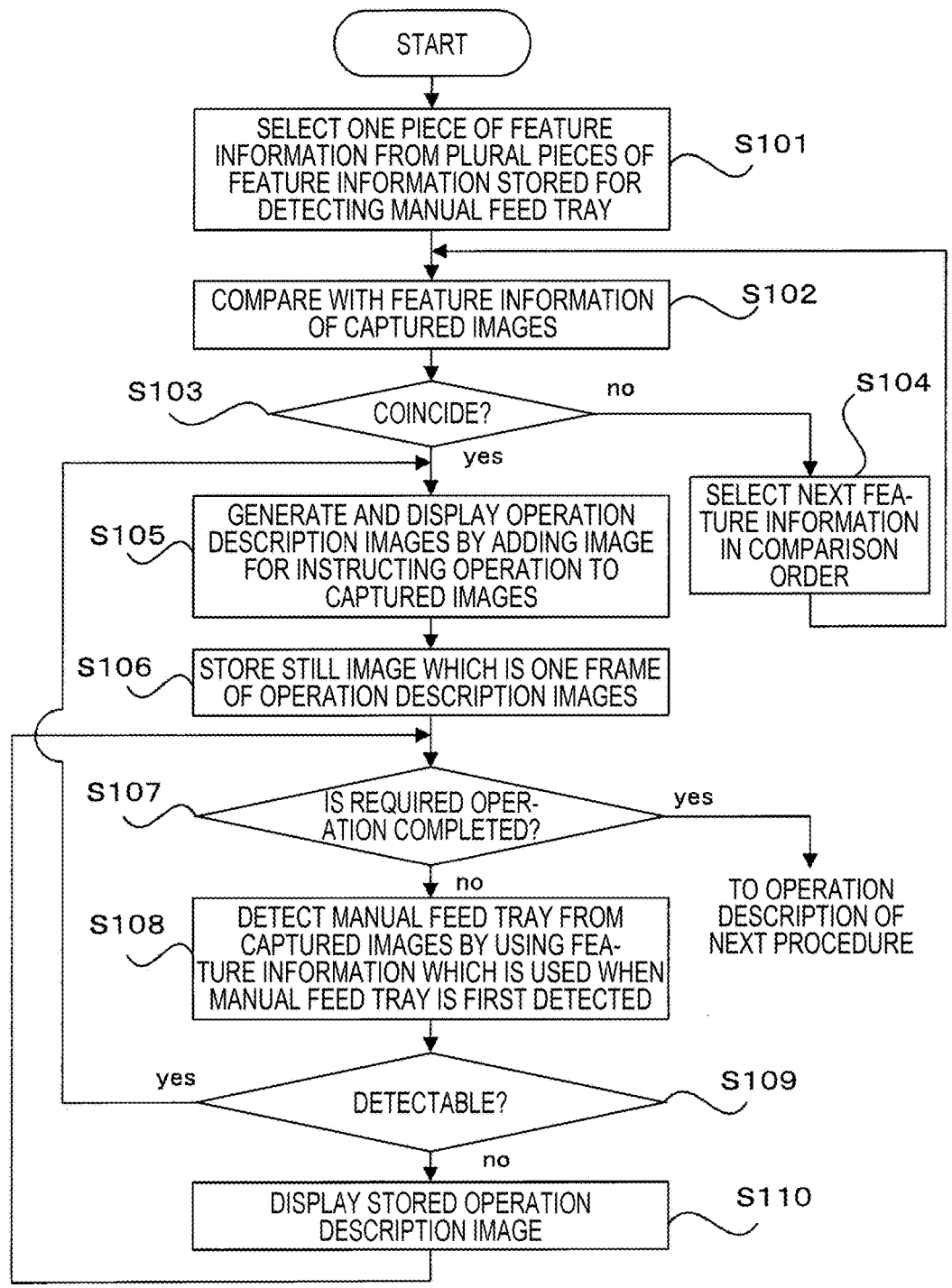
FIG. 5 is a flowchart for describing an operation when the operation is described by displaying an operation description image on the terminal device according to the exemplary embodiment of the present invention.

First, the operation when the operation is described by displaying the operation description image in the terminal device 10 according to the exemplary embodiment of the present invention will be described with reference to the flowchart of FIG. 5. In the flowchart of FIG. 5, description will be made on a case where the specific portion is the manual feed tray and the operation of the manual feed tray is described.

First, upon start of the description on the operation of the manual feed tray, the controller 32 activates the image capturing unit 36 and detects the manual feed tray from the images captured by the image capturing unit 36. At that time, the controller 32 first selects one piece of feature information from the feature information of the plural manual feed tray images stored in the data storing unit 34 (step S101). For example, the controller 32 selects the feature information A from the plural pieces of feature information illustrated in FIG. 4A.

The controller 32 extracts the feature information from the images captured by the image capturing unit 36 and compares the extracted feature information with the selected feature information A (step S102).

If two pieces of compared feature information do not coincide with each other in the comparison processing in step S103 (no in step S103), the controller 32 selects the next feature information in a comparison order from the feature information of the plural manual feed tray images stored in the data storing unit 34 (step S104). For example, when the controller 32 first selects the feature information A and performs the comparison process, the controller 32 selects the feature information B as the next feature information B in the comparison order.

The process of comparing the feature information of the captured images with the selected feature information is repeated (steps S102 and S103).

Then, if the two pieces of compared feature information coincide with each other in the comparison processing in step S103 (yes in step S103), the controller 32 generates the operation description images by adding the image for instructing the operation to the images captured using the AR technique, and displays the generated operation description images on the display 33.

At that time, the controller 32 stores a still image which is one frame of the generated operation description images, in the data storing unit 34 (step S106).

If the required operation for the manual feed tray is not completed (no in step S107), the controller 32 detects the manual feed tray from the captured images by using the feature information which is used when first detecting the manual feed tray (in the processes of steps S101 to S104) (step S108). Then, if the image of the manual feed tray is detected (yes in step S109), the controller 32 repeats the process of generating the operation description images by adding the image for instructing the operation to the images captured by using the AR technique, and displaying the generated operation description images on the display 33 (step S105).

When the description on the operation of the manual feed tray is continued, the controller 32 repeats the processes of steps S105 to S109, thereby sequentially displaying the operation description images on the display 33 at, for example, an interval of 30 frames/second.

Therefore, while the manual feed tray is captured by the image capturing unit 36, even when the direction or the size of the captured images are changed due to the movement of the terminal device 10, the image for describing the operation is also changed and displayed.

If the manual feed tray is not detected from the captured images, the controller 32 displays the still image stored in the data storing unit 34 on the display 33 (step S110).

For example, when a user who holds the terminal device 10 with one hand causes to display the operation description images with the image capturing unit 36 facing the manual feed tray and attempt to actually operate the manual feed tray while viewing the displayed operation description images, there is a case where the manual feed tray is out of the angle of view of the image capturing unit 36. However, in the image forming apparatus 20 of the exemplary embodiment, the still image stored is displayed on the display 33 as described above. Thus, the user may operate the manual feed tray while continuing to view the operation description image with respect to the manual feed tray.

Even when the stored still image is displayed, the process of detecting the manual feed tray from the captured images is continued (step S108). If the manual feed tray is detected (yes in step S109), the operation description images acquired by adding the image for instructing the operation to the captured images are displayed on the display 33 (step S105).

Then, if it is determined that the required operation is performed on the manual feed tray (yes in step S107), the controller 32 proceeds to the operation description at the next step.

Next, an example of a specific operation description performed by the terminal device 10 according to the exemplary embodiment will be described with reference to FIGS. 6A and 6B to FIG. 22.

Figure 6B:
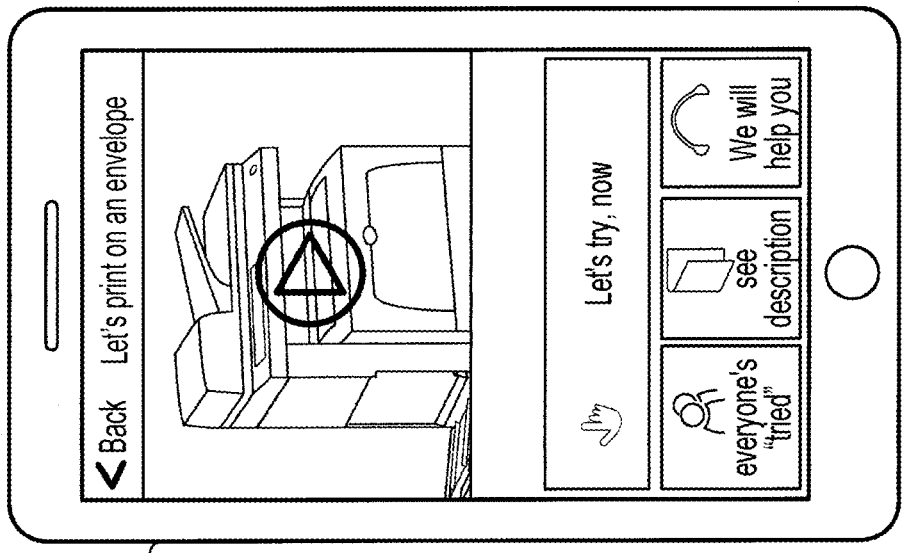
FIGS. 6A and 6B illustrate an example of a display screen illustrating one example of a specific operation description performed by the terminal device according to the exemplary embodiment of the present invention.
Figure 6A:
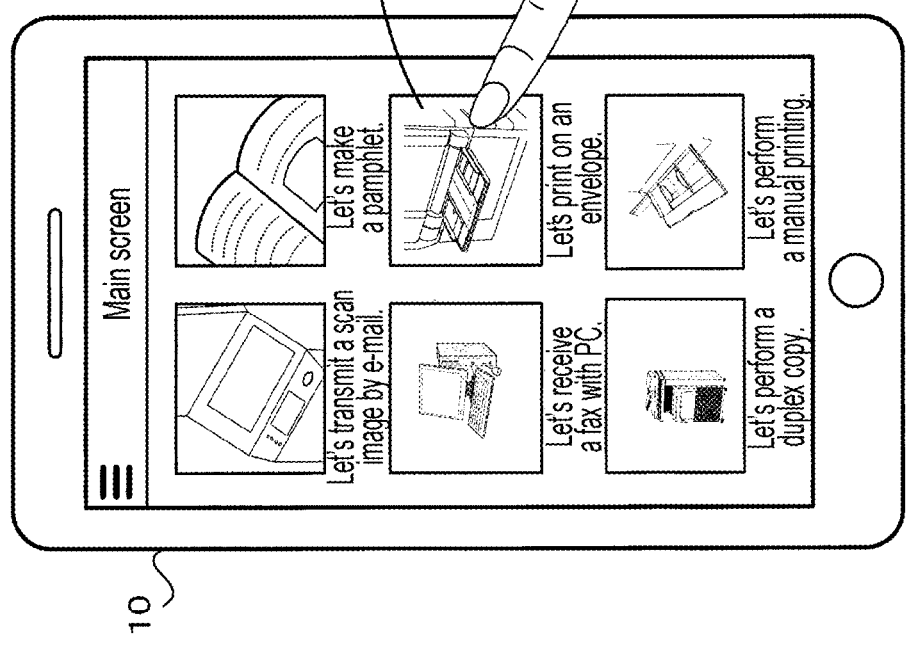

First, FIG. 6A illustrates one example of a main screen when an application for describing the operation which is installed in the terminal device 10 is activated. In the main screen illustrated in FIG. 6A, various description contents for describing the image forming apparatus 20 are displayed. Then, the user selects a description content which he/she wants to receive the operation description, from the description contents. For example, herein, a case where a description content named "Let's print on an envelope" is selected in order to print an addressee on an envelope will be described.

When the user selects the description content, a content screen illustrated in FIG. 6B is displayed. In the content screen illustrated in FIG. 6B, if the user touches the image displayed on an upper half portion, he/she may view a digest moving image of the operation description. Further, on a lower side of the content screen, a button "everyone's "tried"" is displayed. When the user touches this button, he/she may view comments of other users. In addition, similarly, a button "see description" is displayed. If the user touches this button, a web page is displayed by accessing a uniform resource locator (URL) of an electronic manual. Further, similarly, a button "We will help you" is displayed. If the user touches this button, a dialogue is displayed to call a customer center.

Then, by touching the button "Let's try, now," the user may receive the operation description using an AR display. In the following description, an example of displays when the user receives the operation description using the AR display will be described.

Figure 7A:
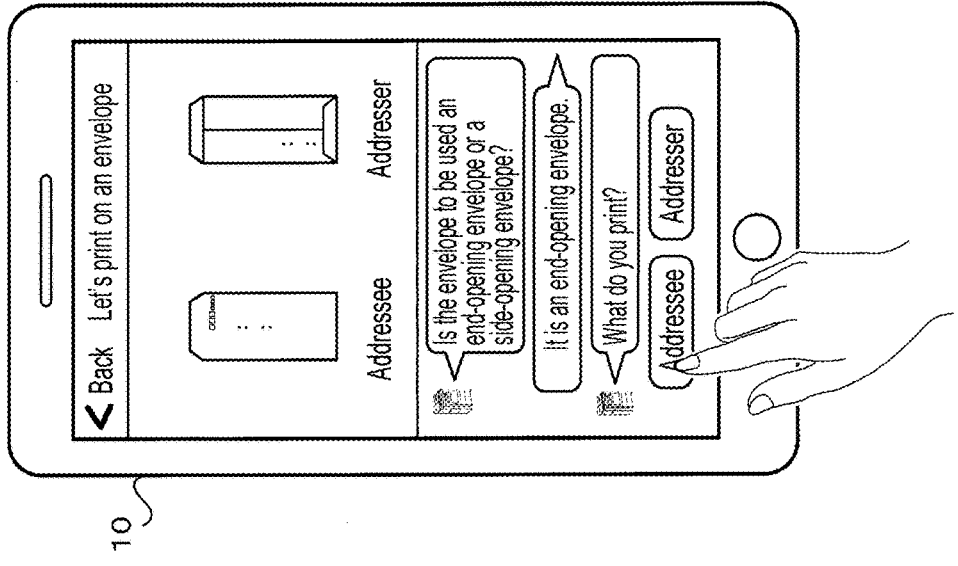
FIGS. 7A and 7B illustrate an example of a display screen illustrating one example of a specific operation description performed by the terminal device according to the exemplary embodiment of the present invention.
Figure 7B:
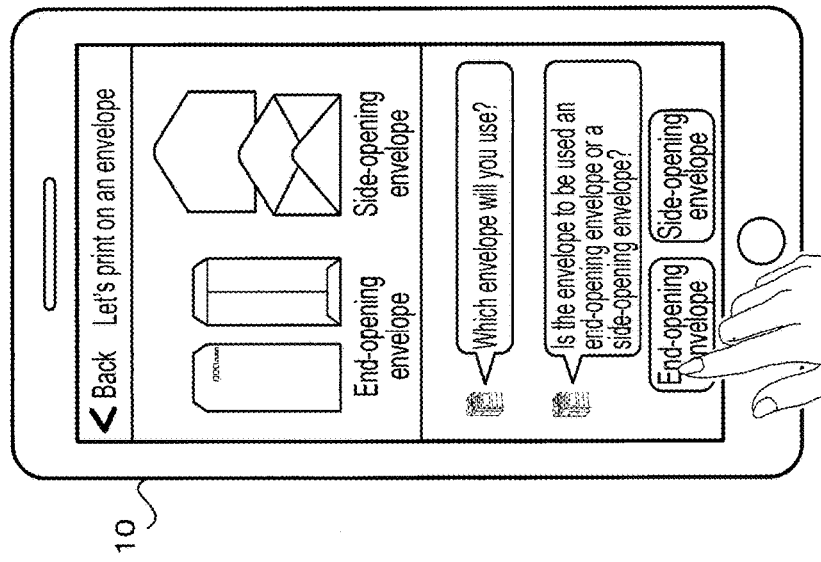

When the user touches the button of "Let's try, now" in FIG. 6B, screens illustrated in FIGS. 7A and 7B are displayed.

FIGS. 7A and 7B illustrate the screens for setting what operation description the user wants, in an interactive manner. The interactive manner is a form that is displayed as if users or the device and the user talk with each other while facing each other. Further, "facing each other" does not necessary require that the users or the device and the user completely face each other, but may mean that contents are displayed as if the users or the device and the user face each other. For example, comments and description contents from the device side are displayed by speech balloons from the right side of the screen and comments and instruction contents on the user side are displayed by the speech balloons from the left side of the screen. The comments and instruction contents may be displayed as if both parties are talking with each other while facing each other. In addition, in the case of three parties, contents may be displayed as if at least two parties face each other. Furthermore, contents may be displayed so that it may be seen who issues comments and when and in what order the comments are issued. For example, as shown in FIG. 7B, the comment issued by the device is displayed as the speech balloon from the image of the device. In addition, the user's comments and the instructed setting contents are displayed by the speech balloons from a place different from the image of the device. Furthermore, the comments are arranged from top to bottom in the order of comments. Further, a comment time may be displayed on the periphery of each balloon.

Specifically, in FIG. 7A, the user touches a button "End-opening envelope" in response to a question "Is the envelope to be used an end-opening envelope or a side-opening envelope?". As a result, as illustrated in FIG. 7B, the reply "It is an end-opening envelope." is made and displayed, and a next question "What do you print?" is displayed.

Then, when the user touches the button "Addressee," as illustrated in FIG. 8A, the reply "Addressee." is made and displayed, and a next question "Is paste attached to the envelope?" is displayed.

Then, when the user touches the button "Paste," as illustrated in FIG. 8B, the reply "Paste." is made and displayed, and an instruction "Bring the envelope, and go to the place of the multifunction device A1234 to be used." is displayed.

As described above, the terminal device 10 presents candidates of operations of the image forming apparatus 20 in the interactive screen and receives selection from the user. Then, the operation description corresponding to the selected content is displayed in the same interactive screen. As a result, the user may select the operation description desired to be displayed in the interactive screen and confirm the contents of the operation description.

Figure 9:
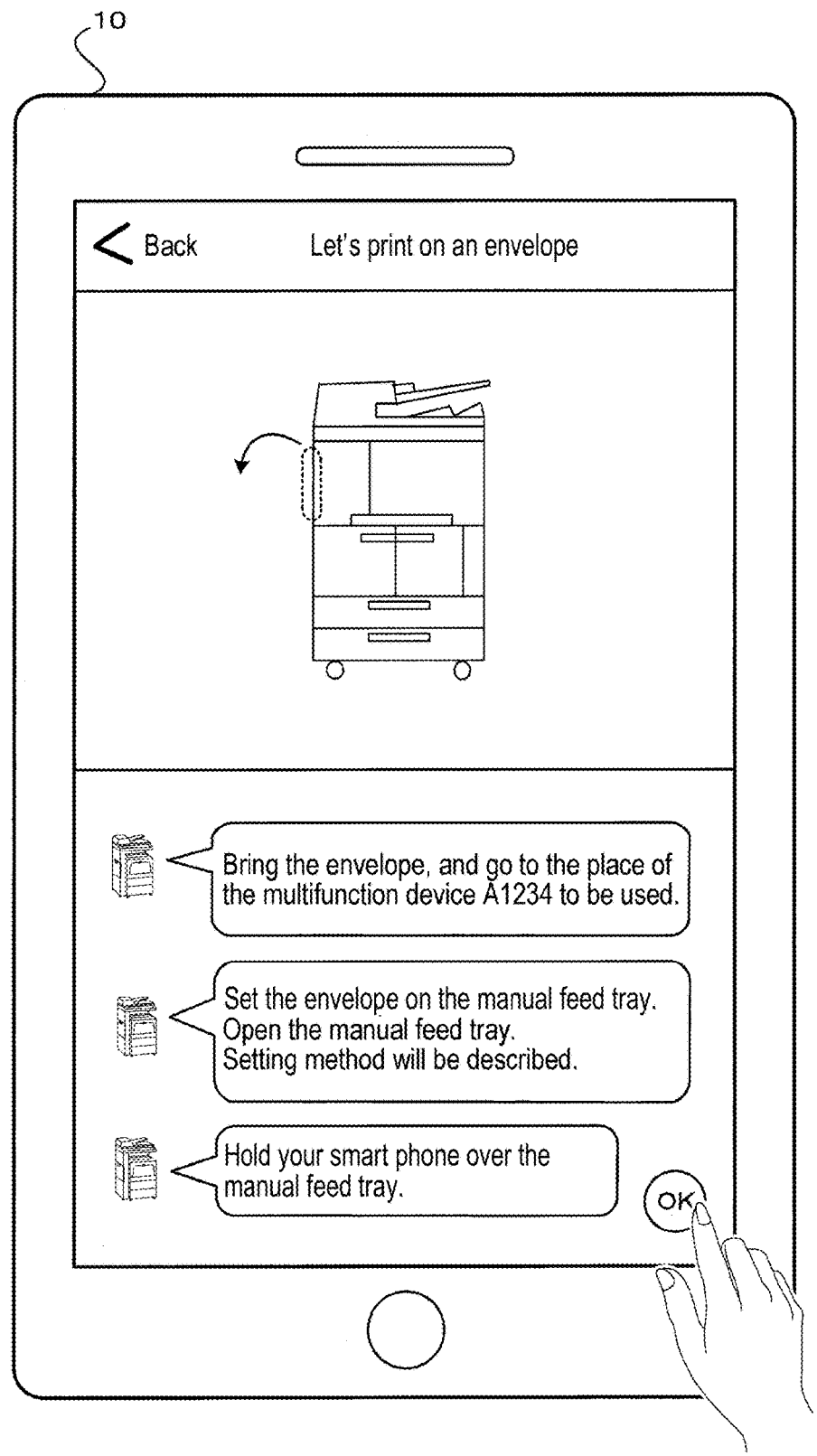
FIG. 9 illustrates an example of a display screen illustrating one example of a specific operation description performed by the terminal device according to the exemplary embodiment of the present invention.

Then, according to this instruction, the user who moves to the place where the multifunction device is installed touches an OK button, whereby the screen illustrated in FIG. 9 is displayed.

In the example of the display screen illustrated in FIG. 9, "Set the envelope on the manual feed tray. Open the manual feed tray. The setting method will be described." is displayed, and an instruction "Hold your smartphone over the manual feed tray." is displayed. In addition, in FIG. 9, an external image of the image forming apparatus 20 and the place of the manual feed tray are displayed on the upper half portion of the terminal device 10, and an instruction to open the manual feed tray are displayed.

Figure 10:
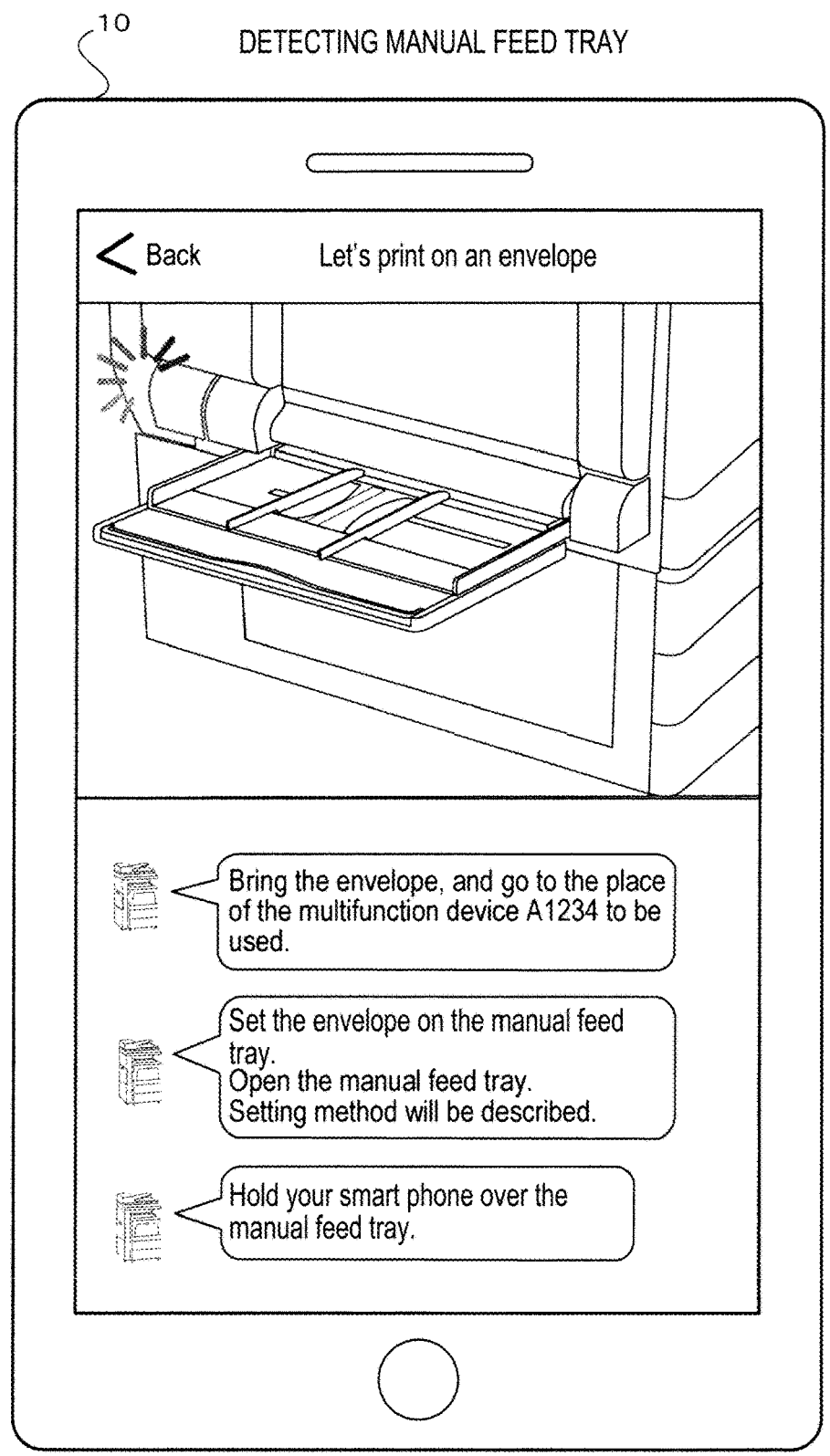
FIG. 10 illustrates an example of a display screen illustrating one example of a specific operation description performed by the terminal device according to the exemplary embodiment of the present invention.

FIG. 10 illustrates a state in which the user opens the manual feed tray of the image forming apparatus 20 and directs the terminal device 10 which is the smartphone to the opened manual feed tray.

FIG. 10 illustrate a state in which the manual feed tray is captured by the image capturing unit 36 by directing the terminal device 10 to the manual feed tray, and the captured images are displayed. In FIG. 10, a process-in-progress indication for indicating that a process of detecting a manual feed tray from the captured images is being performed is displayed.

Figure 11:
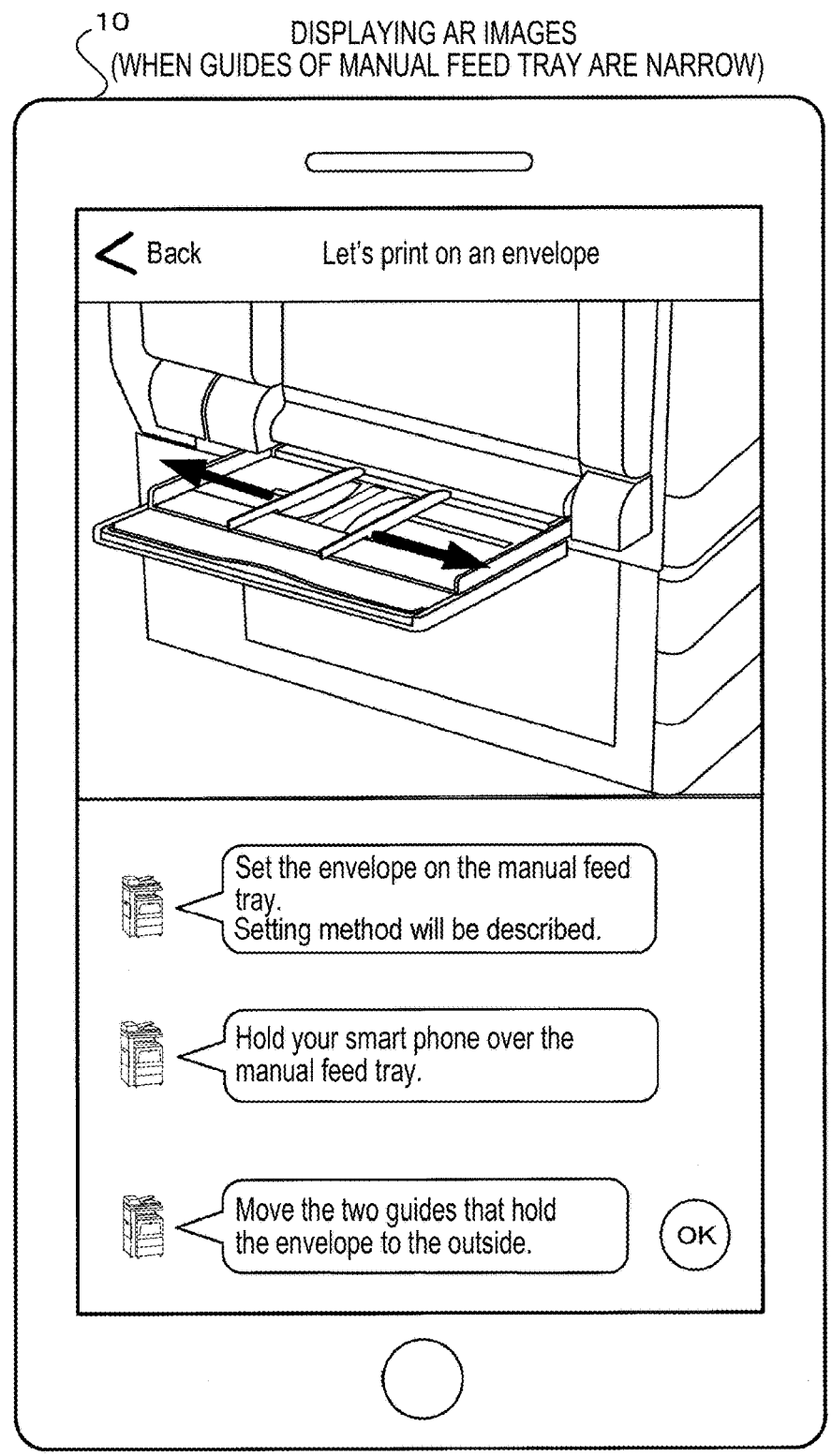
FIG. 11 illustrates an example of a display screen illustrating one example of a specific operation description performed by the terminal device according to the exemplary embodiment of the present invention.

FIG. 11 illustrates a state in which the image of the manual feed tray is detected from the captured images and the operation description images acquired by adding the arrow image for instructing to operate to the detected images of the manual feed tray are displayed.

FIG. 11 illustrates a display example of a case where since guides of the manual feed tray in the captured images are too narrow to print the addressee on the envelope, the controller 32 adds the arrow image for instructing to move the guides of the manual feed tray to the outside to the captured images of the manual feed tray. Further, in the example of the display screen in FIG. 11, it can be seen that the phrase "Move the two guides for holding the envelope to the outside." is displayed, and a specific content of the manual instruction using the AR images to the user is displayed.

A specific state when such a display is performed will be described with reference to FIGS. 12 and 13.

Figure 12:
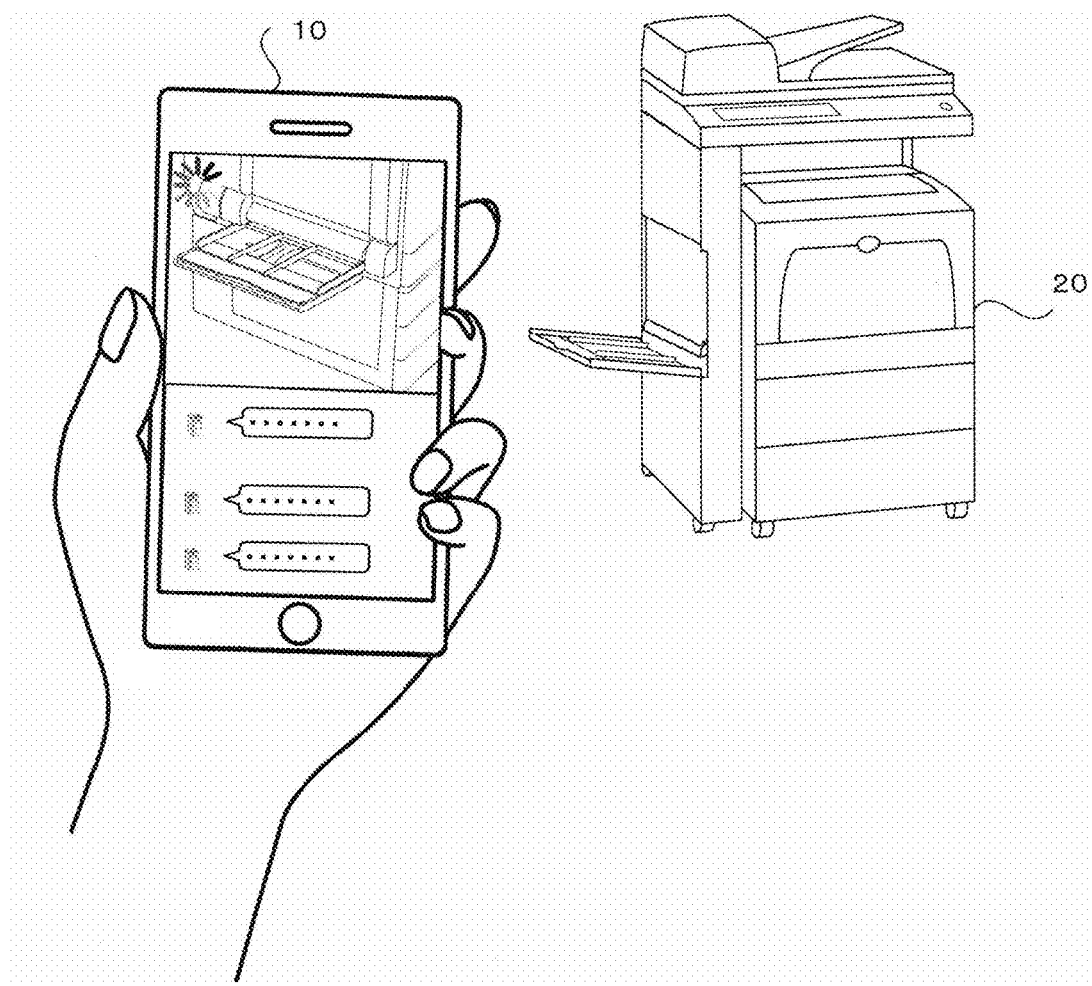
FIG. 12 illustrates an example of a display screen illustrating one example of a specific operation description performed by the terminal device according to the exemplary embodiment of the present invention.
Figure 13:
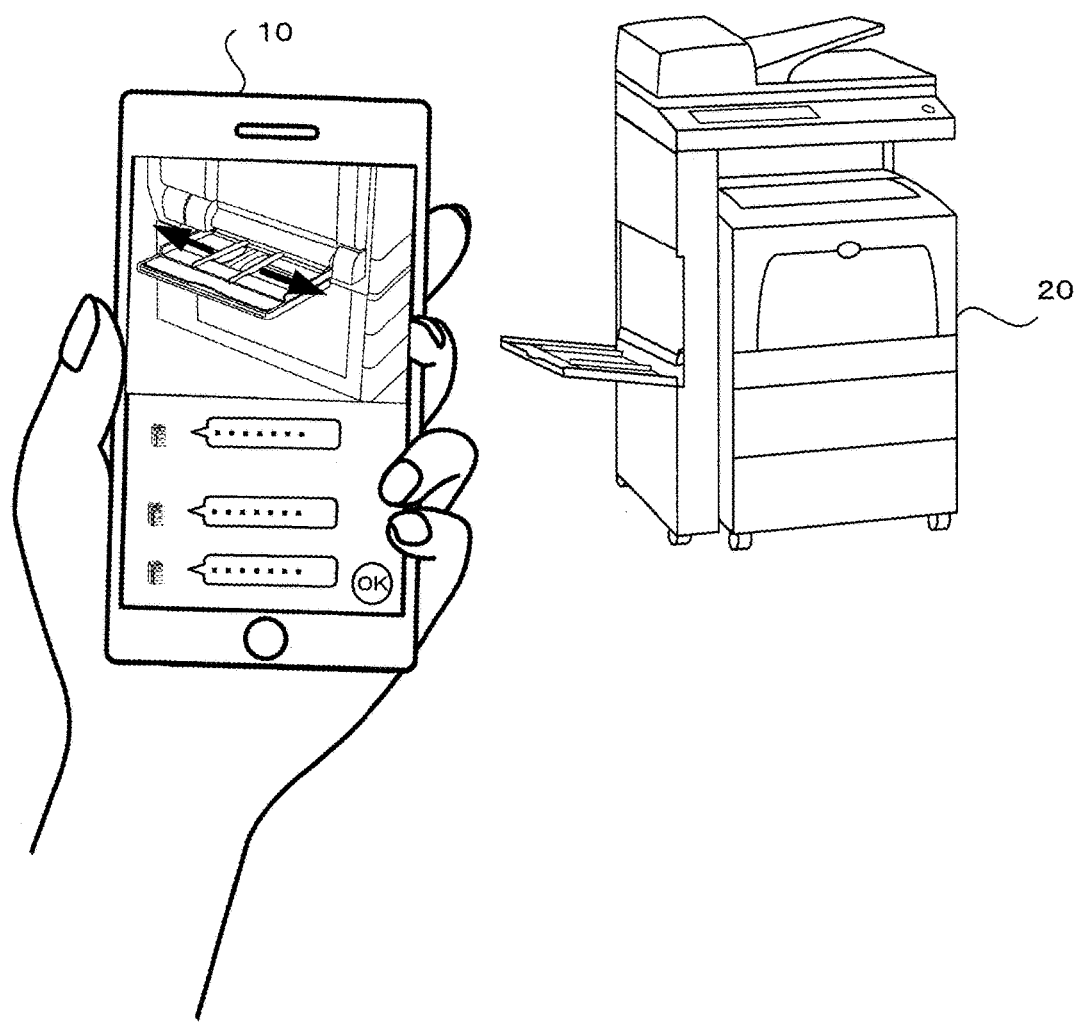
FIG. 13 illustrates an example of a display screen illustrating one example of a specific operation description performed by the terminal device according to the exemplary embodiment of the present invention.

When the user directs the terminal device 10 to the manual feed tray of the image forming apparatus 20, only the images of the manual feed tray is initially displayed as illustrated in FIG. 12. However, when the manual feed tray is detected and the AR display is performed, images acquired by adding the arrow image instructing an operation to be performed by the user to the images of the manual feed tray are displayed as illustrated in FIG. 13.

In the example of the display screen illustrated in FIG. 11, a guide width in the manual feed tray of the image forming apparatus 20 is too narrow to print on the envelope. If the guide width is too wide to print on the envelope, the content illustrated in FIG. 14 is displayed.

Figure 14:
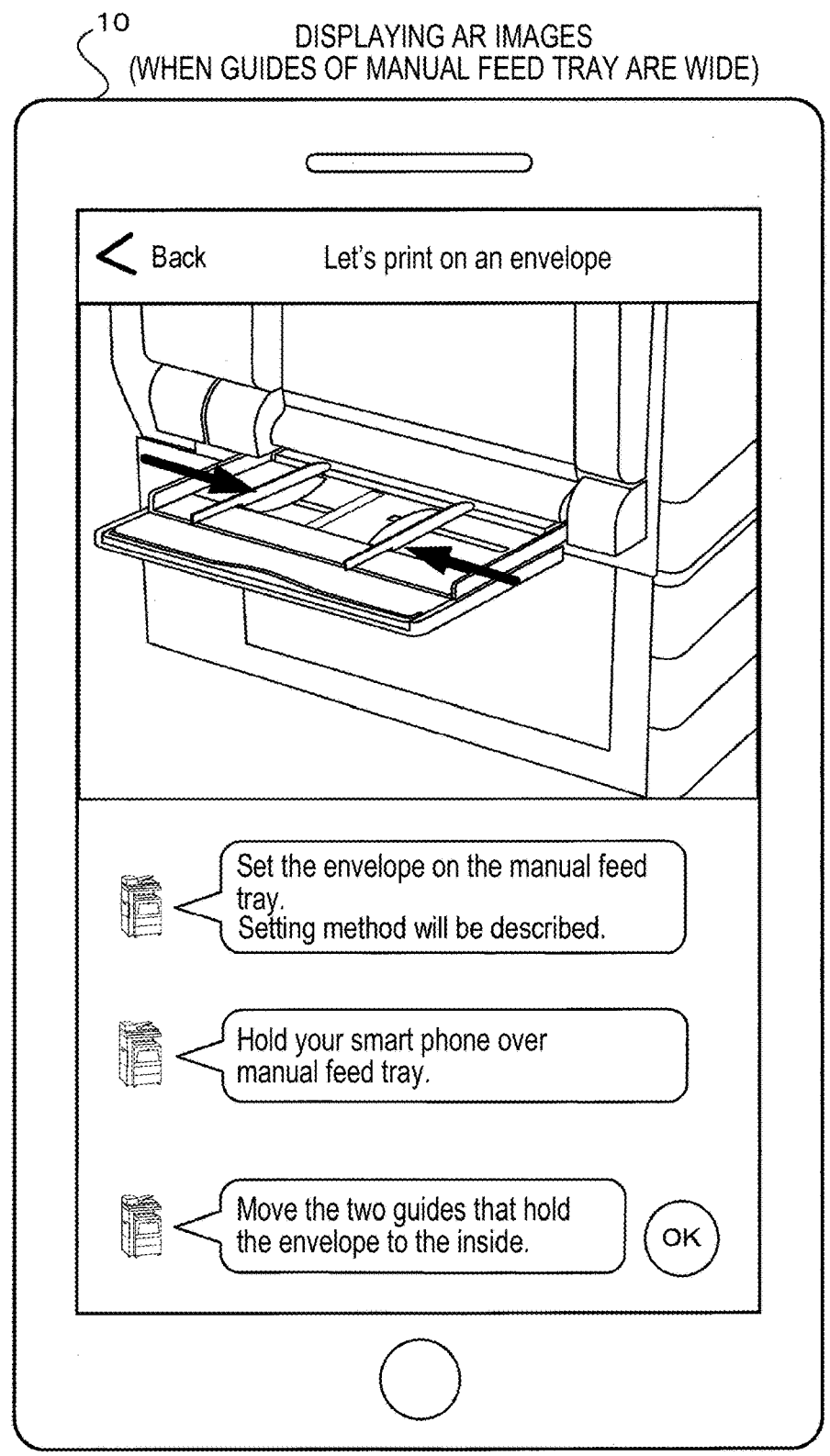
FIG. 14 illustrates an example of a display screen illustrating one example of a specific operation description performed by the terminal device according to the exemplary embodiment of the present invention.

FIG. 14 illustrates a display example of a case where since the guides of the manual feed tray in the captured image are too wide to print the addressee of the envelope, the controller 32 adds an arrow image for instructing to move the guides of the manual feed tray to the inside to the captured images of the manual feed tray. Further, in the example of the display screen in FIG. 14, it can be seen that a phrase "Move the two guides for holding the envelope to the inside." is displayed, and a specific content of the operation instruction using the AR images to the user is displayed.

Next, an operation when the user who holds the terminal device 10 in which the AR images are displayed intends to operate the manual feed tray will be described.

In order to continue such an AR display, it is necessary to continue to capture the manual feed tray by the image capturing unit 36 of the terminal device 10. However, it may be difficult to operation the manual feed tray while capturing the manual feed tray which is a part of the operation target. Particularly, in the case of performing the operation using both hands, it is almost impossible to make the terminal device 10 direct to a specific portion of the operation target.

Figure 15:
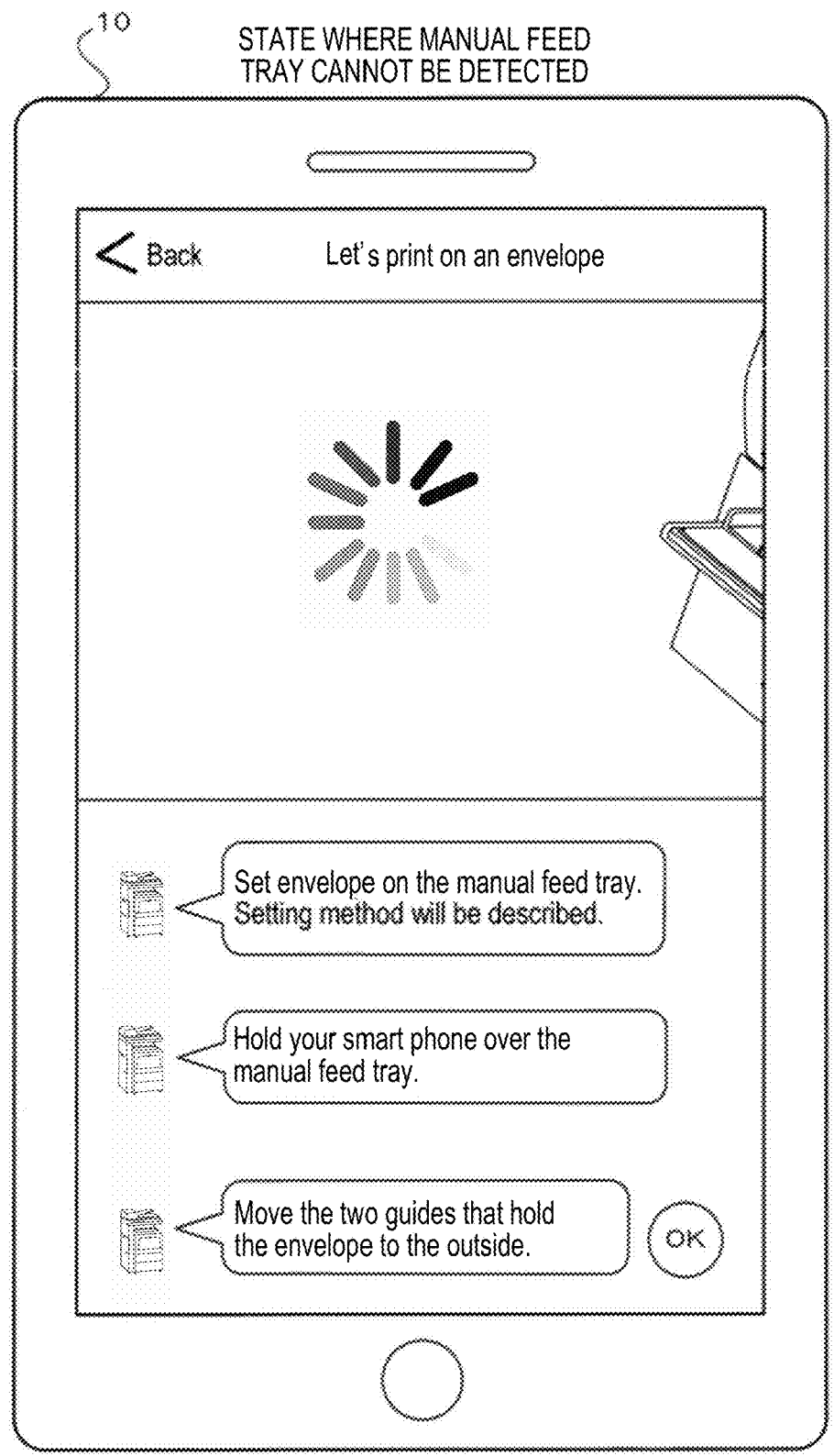
FIG. 15 illustrates an example of a display screen illustrating one example of a specific operation description performed by the terminal device according to the exemplary embodiment of the present invention.

Therefore, when the user intends to perform the operation, the specific portion of the operation target may be out of the angle of view of the image capturing unit 36. Specifically, as illustrated in FIG. 15, the manual feed tray is out of the captured images, so that the controller 32 cannot detect the manual feed tray in the captured images.

However, in the terminal device 10 of the exemplary embodiment, when the operation description images are being sequentially displayed, a process of storing the latest operation description image in the data storing unit 34 as the still image is performed. If the manual feed tray as the specific portion cannot be detected, the stored still image is displayed.

Figure 16:
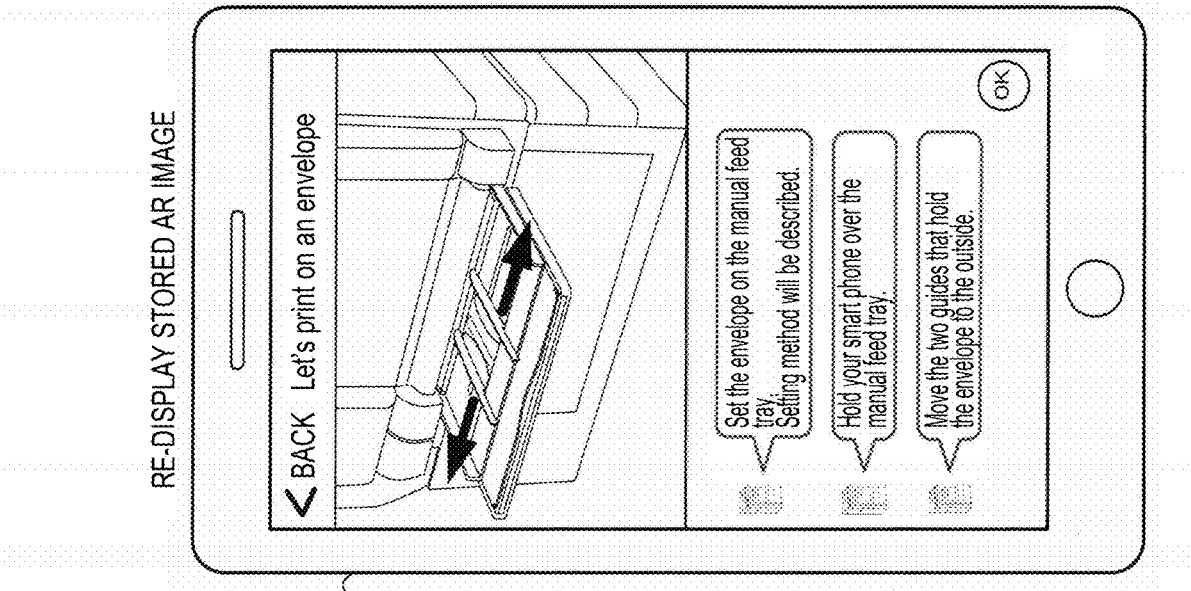
FIG. 16 illustrates an example of a display screen illustrating one example of a specific operation description performed by the terminal device according to the exemplary embodiment of the present invention.

Therefore, as illustrated in FIG. 16, if the manual feed tray cannot be detected, the stored AR image is displayed again and the user continues to view the operation description image which is the still image.

Figure 17:
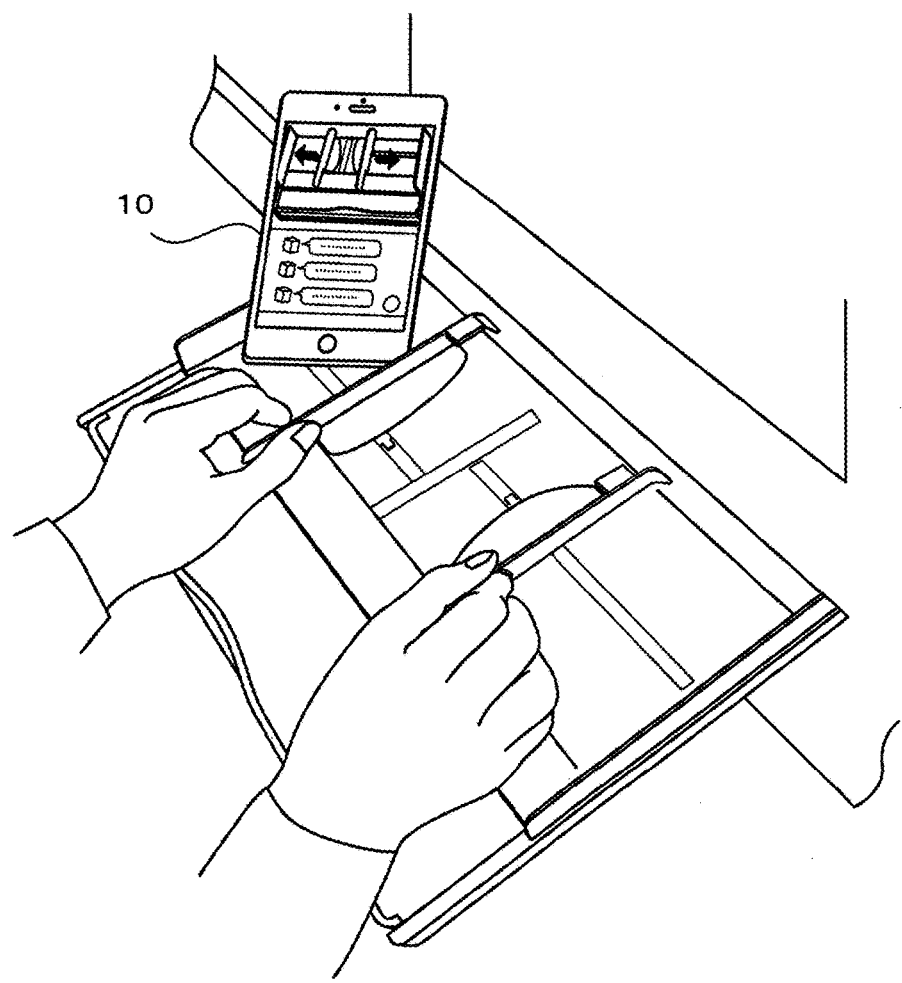
FIG. 17 illustrates an example of a display screen illustrating one example of a specific operation description performed by the terminal device according to the exemplary embodiment of the present invention.

Therefore, in the operation description system of the exemplary embodiment, as illustrated in FIG. 17, even when the terminal device 10 is placed beside the manual feed tray, the operation description image is continued to be displayed. The user operates the manual feed tray with both hands while viewing the display.

Figure 18:
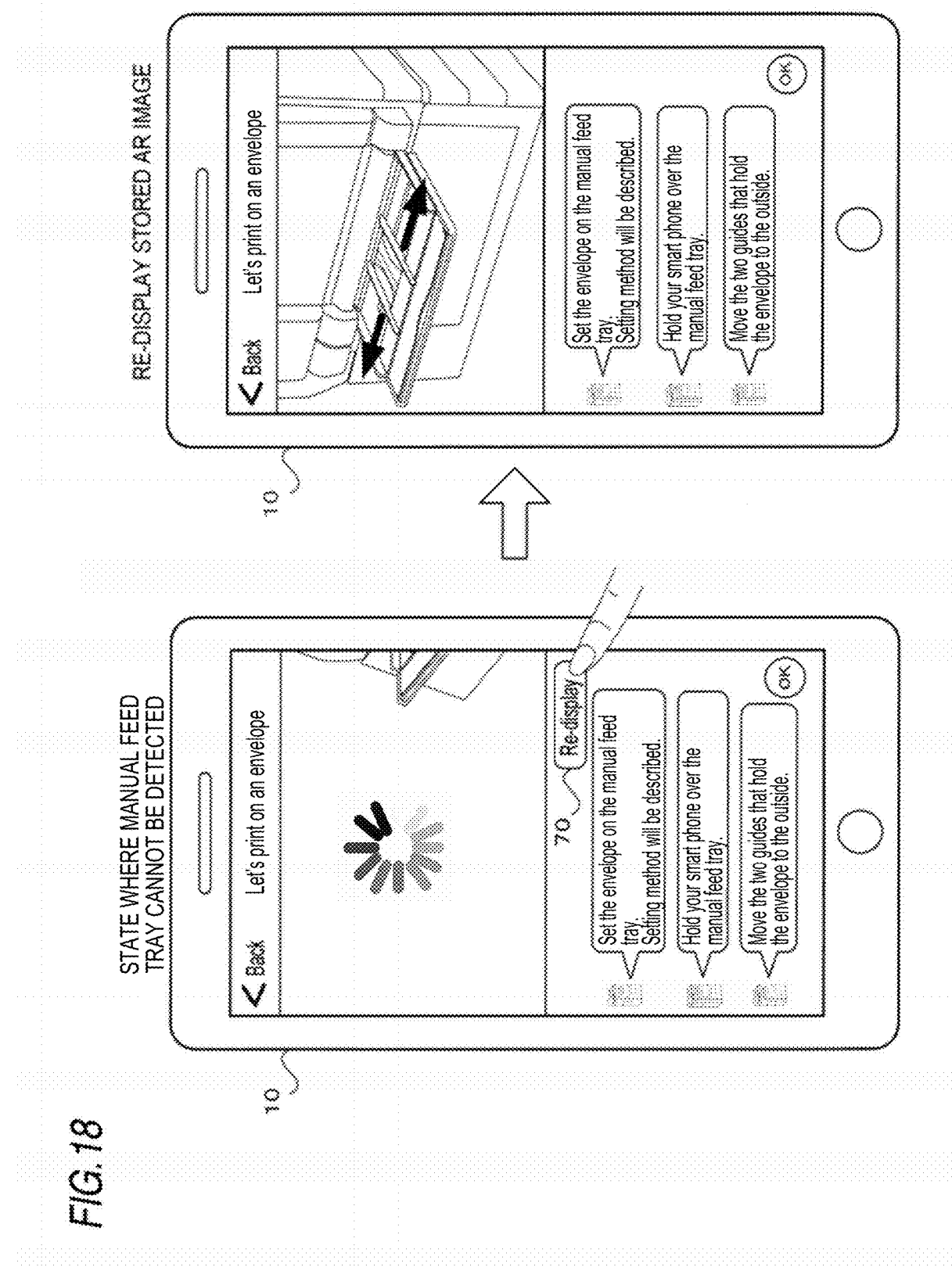
FIG. 18 illustrates an example of a display screen illustrating one example of a specific operation description performed by the terminal device according to the exemplary embodiment of the present invention.

When the manual feed tray to be described is not detected from the captured images, the stored still image is not automatically displayed but a re-display button 70 may be displayed as illustrated in FIG. 18. Then, when the user operates the re-display button 70 to instruct to display the stored AR image, the stored AR image may be displayed.

Figure 19:
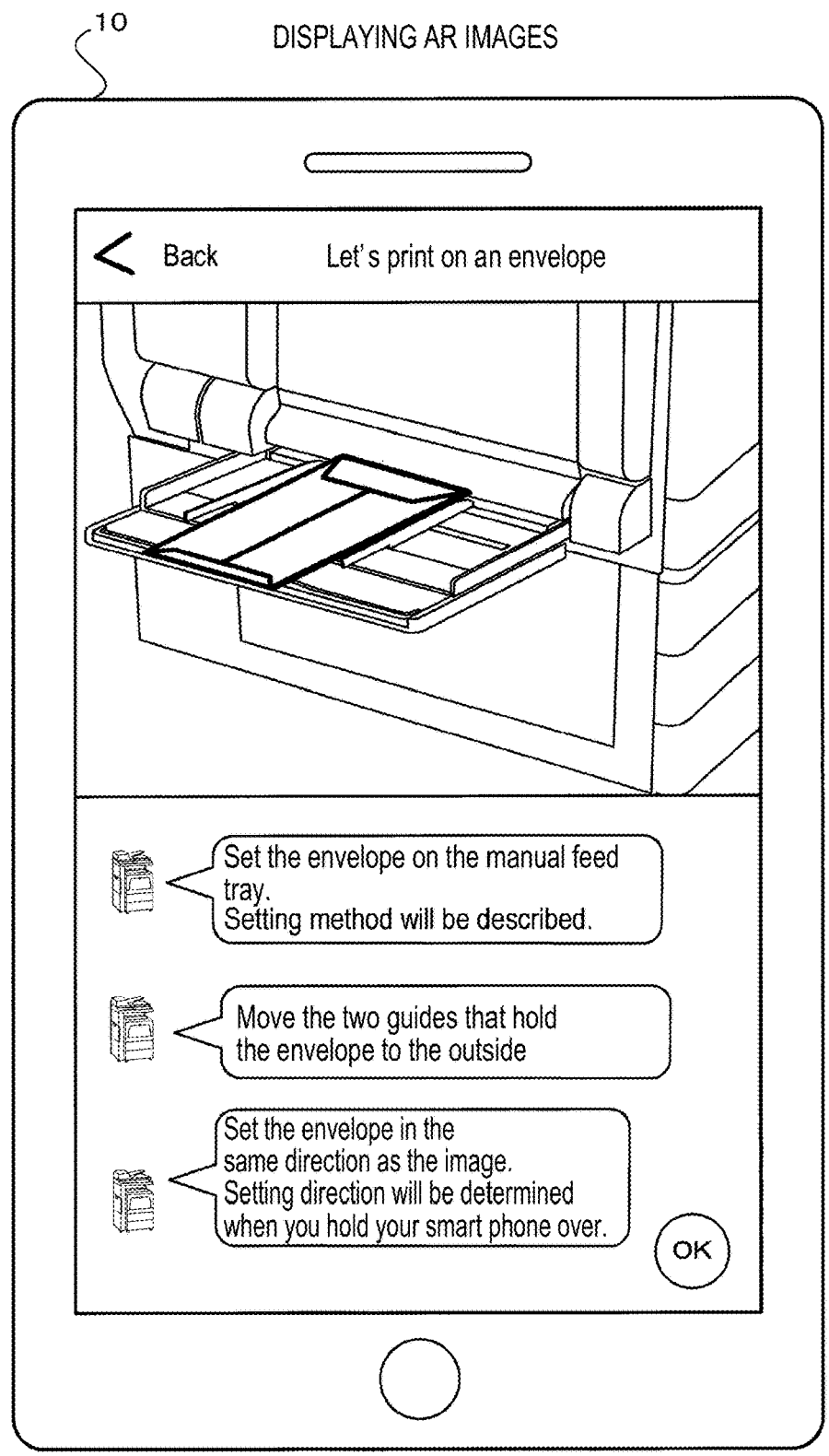
FIG. 19 illustrates an example of a display screen illustrating one example of a specific operation description performed by the terminal device according to the exemplary embodiment of the present invention.

Next, FIG. 19 illustrates an example of an operation description screen in the next procedure which is displayed when the user touches the OK button after operating the guides in accordance with the above described AR image.

FIG. 19 illustrates one example of a case where AR images for instructing an operation to set the envelope on the manual feed tray are displayed after the guide width is adjusted.

The AR image of FIG. 19 illustrates a state in which the envelope image is added to the captured images of the manual feed tray.

Figure 20:
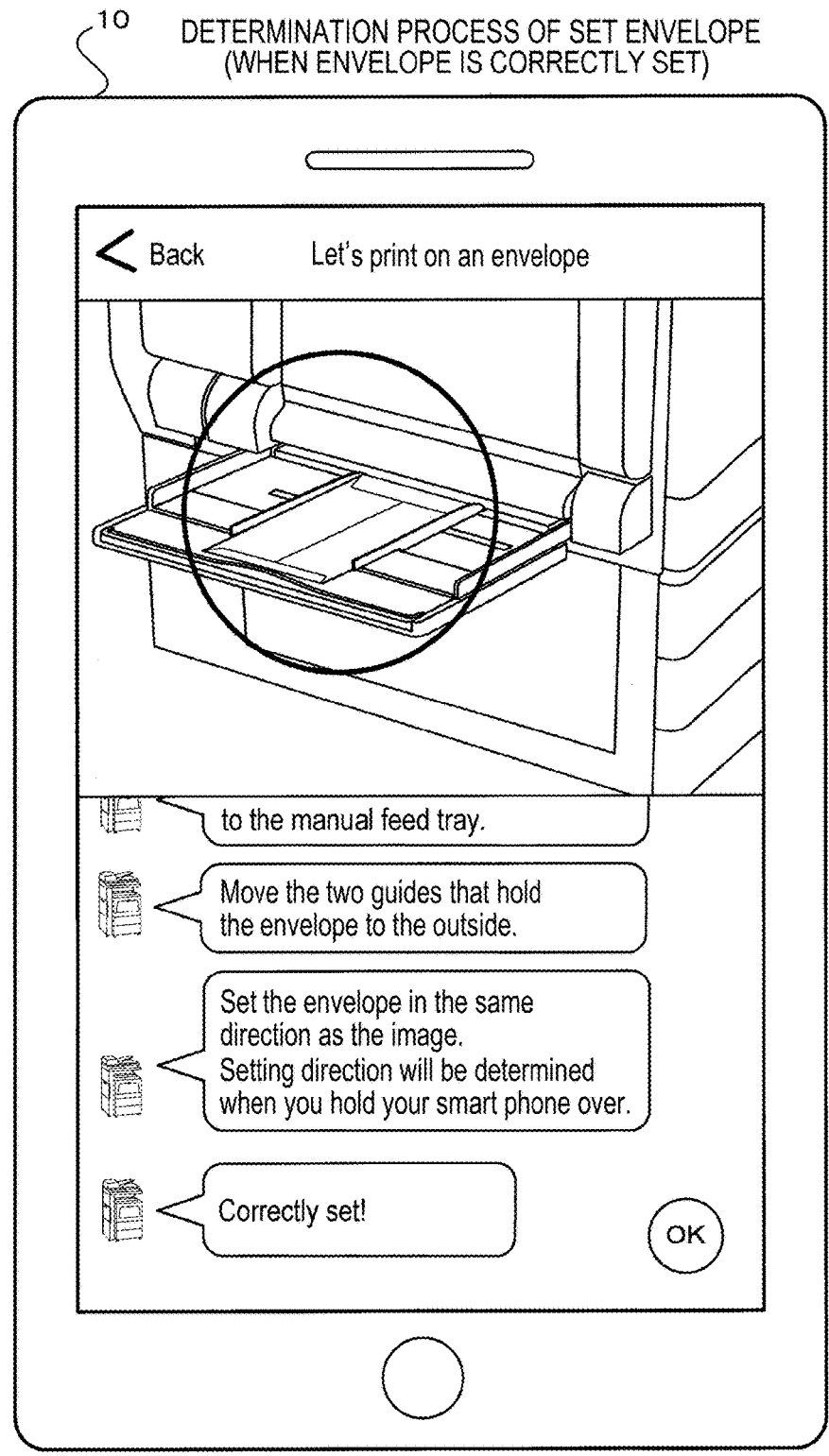
FIG. 20 illustrates an example of a display screen illustrating one example of a specific operation description performed by the terminal device according to the exemplary embodiment of the present invention.
Figure 21:
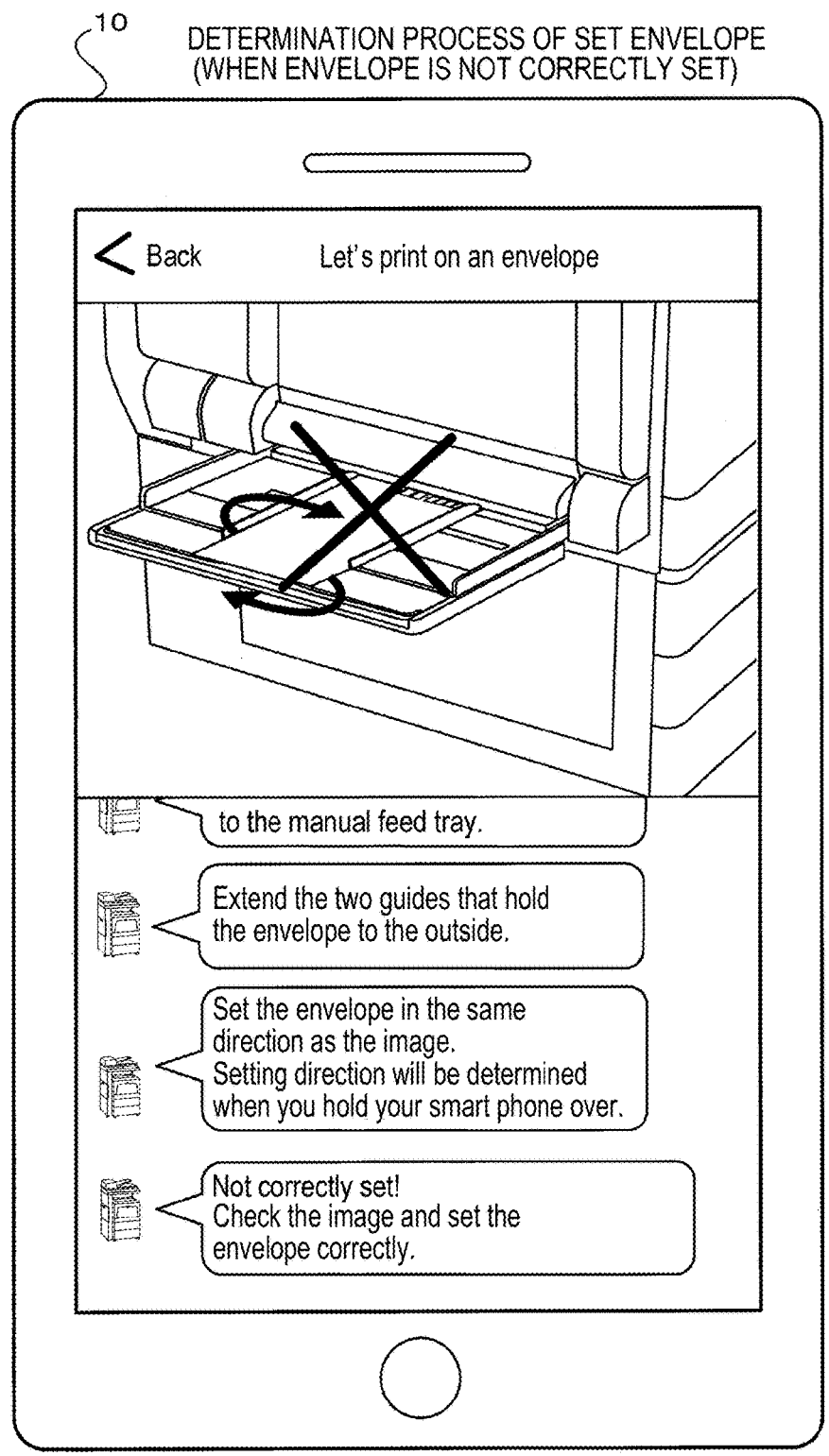
FIG. 21 illustrates an example of a display screen illustrating one example of a specific operation description performed by the terminal device according to the exemplary embodiment of the present invention.

FIGS. 20 and 21 illustrate examples of screens displayed when the user actually sets the envelope on the manual feed tray with reference to the AR images illustrated in FIG. 19 and touches the OK button.

FIG. 20 illustrates a display example when the direction of the envelope set in the manual feed tray is correct. Upon detecting, from the images captured by the image capturing unit 36, that the envelope is correctly set on the manual feed tray, the controller 32 displays to the user a large circle indicating that the envelope is set in the correct direction, in the images and displays a phrase "Correctly set!."

FIG. 21 illustrates a display example when the direction of the envelope set in the manual feed tray is not correct. Upon detecting, from the images captured by the image capturing unit 36, that the envelope is not correctly set on the manual feed tray, the controller 32 displays to the user a large cross mark indicating that the envelope is not set in the correct direction in the images and displays a phrase "Not correctly set! Please check the image and set the envelope correctly."

In FIG. 21, an arrow image for rotating the direction of the envelope is added and displayed as a correction instruction for correctly setting the envelope, in the images again.

Figure 22:
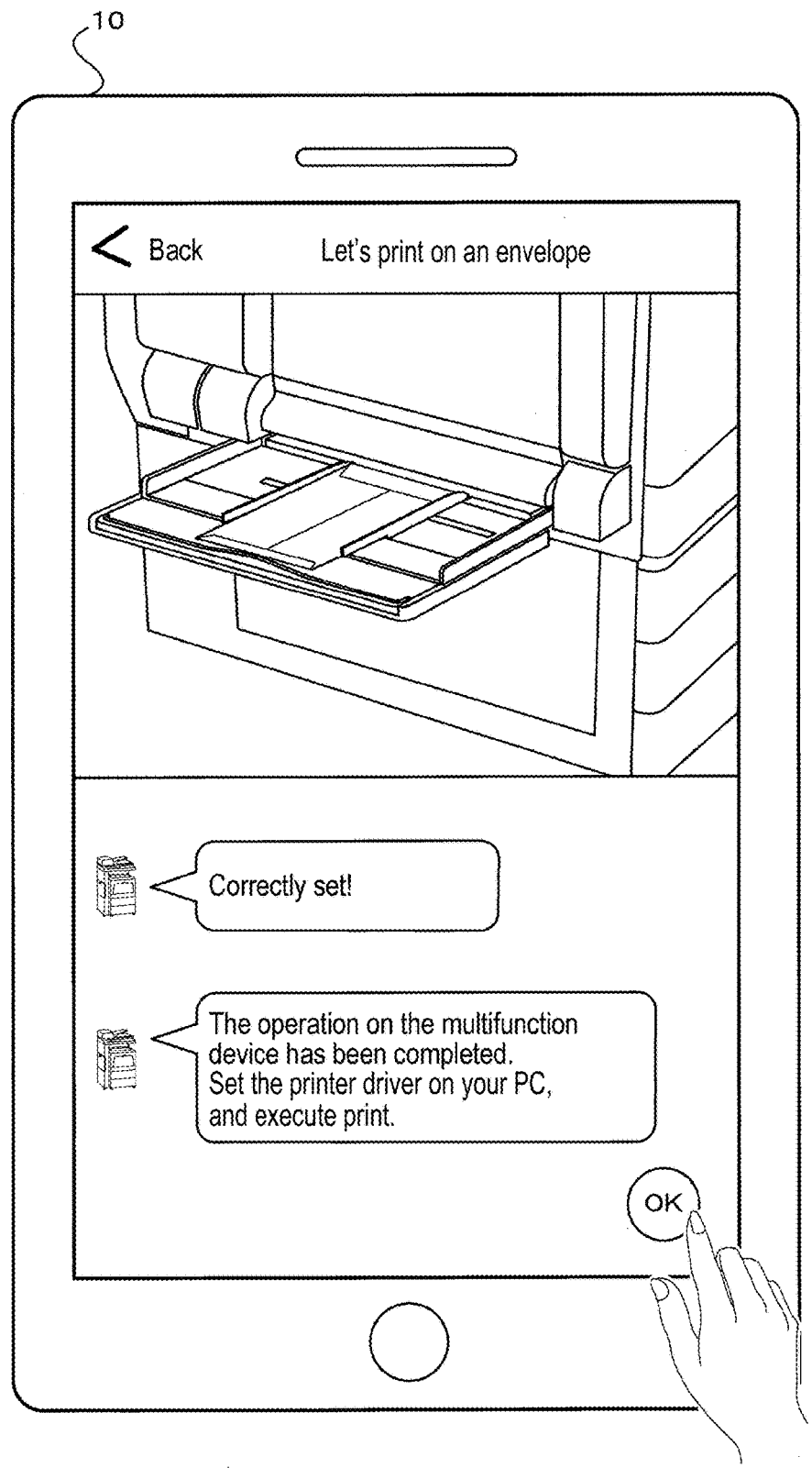
FIG. 22 illustrates an example of a display screen illustrating one example of a specific operation description performed by the terminal device according to the exemplary embodiment of the present invention.

If it is determined that the envelope is correctly set as illustrated in FIG. 20, the OK button is displayed on the screen. When the user touches the OK button, as illustrated in FIG. 22, "The operation on the multifunction device has been completed. Set the printer driver on your PC and execute print." is displayed. By viewing this display, the user knows that the operation is to be performed in the personal computer later and the user goes to the location of his/her personal computer and sets the printer driver.

MODIFIED EXAMPLE

In the exemplary embodiment, the description is made by using the case where the specific portion to be described is the manual feed tray. It should be noted that the exemplary embodiments of the present invention are not limited thereto. The exemplary embodiment is similarly applicable to even a case where an operation of another specific portions is described, other than the manual feed tray. Examples of the other specific portion include an operation panel, a paper tray, a paper discharge tray, and a duplex automatic document feeder.

In the exemplary embodiment, the case where the target the operation of which is to be described is the image forming apparatus is described. It should be noted that exemplary embodiments of the present invention are not limited thereto. The exemplary embodiment is similarly applicable even to a case where the target the operation of which is to be described is various devices such as an image reading apparatus such as a scanner, various information processing apparatuses such as a personal computer, home appliances such as a washing machine and a refrigerator, and various types of equipment such as assembled furniture, and a storage container. For example, when the target is the assembled furniture, it is possible to describe an assembling method by the exemplary embodiment of the present invention. When the target is the storage container, it is possible to describe a handling method such as a method for opening or closing the storage container.

In the exemplary embodiment, an example in which the button "We will help you" is displayed in FIG. 6B and a dialogue display is made to call the customer center by touching the button is used and described. It should be noted that the exemplary embodiments of the present invention are not limited thereto. When the button of "We will help you" is pressed, the user and an operator at the customer center may interactively communicate with each other. In this case, the description from the operator is displayed on the screen of the terminal device 10 as the speech balloon in place of the speech balloon of the operation description on the device side. In addition, when the button "We will help you" is pressed, the contents of the dialogue up to that time may be transmitted to a terminal device of the operator of the customer center. As a result, the operator may know the setting contents of the user before the button is pressed, so that a more accurate description on the operation may be sent to the terminal device 10. In this case, the contents displayed on the screen of the terminal device 10 are also displayed on the terminal device on the operator side. When the operator inputs the comment in his/her terminal device, the comment is transmitted to the terminal device 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a camera configured to capture images of a real space;
a display; and
a controller configured to:
if an image of a specific portion of a target of an operation of which is to be described is included in the images currently being captured by the camera, generate operation description images by adding an image for instructing the operation to the images currently being captured by the camera and control the display to sequentially display the generated operation description images;
when generating the operation description images, cause a part of the generated operation description images to be stored; and
if the specific portion cannot be detected from the images currently being captured by the camera before description on the operation of the specific portion is completed, control the display to display the stored operation description images previously generated.

2. The information processing apparatus according to claim 1, wherein the controller is configured to store a latest operation description image by updating an already stored operation description image using the generated operation description images.

3. The information processing apparatus according to claim 1, wherein
the controller is configured to cause the generated operation description images to be stored, and
if an operation description image that was displayed in the past is instructed for display, the controller displays on the display the operation description image instructed to be displayed.

4. The information processing apparatus according to claim 1, further comprising:
a memory configured to store feature information of the image of the specific portion of the target of the operation of which is to be described,
wherein if feature information in the images captured by the camera coincides with any of the feature information stored in the memory, the controller determines that the specific portion to be described is included in the images captured by the camera.

5. The information processing apparatus according to claim 4, wherein,
if the description on the operation of the specific portion is continued and if the feature information stored in the memory used in first detecting the specific portion for the operation of which is to be described does not coincide with the feature information in the images captured by the camera, the controller determines that the specific portion cannot be detected from the images captured by the camera.

6. The information processing apparatus according to claim 4, wherein
even when the stored operation description images are being displayed on the display, the controller determines whether the image of the specific portion of the target of the operation of which to be described is included in the images captured by the camera, and
if the image of the specific portion to be described is included in the captured images, the controller switches the display from displaying the stored operation description images to displaying the generated operation description images acquired by adding the image for instructing the operation to the images captured by the camera.

7. The information processing apparatus according to claim 1, wherein if a required operation is detected to be performed on the specific portion, the controller determines that the description on the operation of the specific portion is completed.

8. The information processing apparatus according to claim 7, wherein when a user inputs completion of the operation, the controller determines that the required operation is performed on the specific portion.

9. The information processing apparatus according to claim 7, wherein the controller is configured to detect that the required operation is performed on the specific portion, based on the image of the specific portion included in the images captured by the camera.

10. The information processing apparatus according to claim 1, wherein the controller is configured to determine whether a correct operation is performed on the specific portion, based on the image of the specific portion included in the images captured by the camera.

11. The information processing apparatus according to claim 10, wherein if the correct operation is determined to be performed on the specific portion, the controller causes the display to display information indicating that the correct operation is performed.

12. The information processing apparatus according to claim 10, wherein the correct operation is determined to not be performed on the specific portion, the controller causes the display to display information indicating that an erroneous operation is performed, and adds and displays a correction instruction image for performing the correct operation.

13. An information processing method comprising:
if an image of a specific portion of a target of an operation of which is to be described is included in images of a real space currently being captured by a camera, generating operation description images by adding an image for instructing the operation to the images currently being captured by the camera;
storing a part of the generated operation description images;
displaying the generated operation description images; and
if the specific portion cannot be detected from the images of the real space currently being captured by the camera before description on the operation of the specific portion is completed, displaying the stored operation description images previously generated.

14. A non-transitory computer readable storage medium storing a program that causing a computer to execute information processing, the information processing comprising:
if an image of a specific portion of a target of an operation of which is to be described is included in images of a real space currently being captured by a camera, generating operation description images by adding an image for instructing the operation to the images currently being captured by the camera;
storing a part of the generated operation description images;
displaying the generated operation description images; and
if the specific portion cannot be detected from the images of the real space currently being captured by the camera before description on the operation of the specific portion is completed, displaying the stored operation description images previously generated.

* * * * *